United States Patent [19]
Golovin et al.

[11] Patent Number: 5,541,020
[45] Date of Patent: Jul. 30, 1996

[54] COMPOSITIONS AND METHODS FOR IMPROVING THE CUMULATIVE CAPACITY OF SOLID, SECONDARY ELECTROLYTIC CELLS

[76] Inventors: Milton N. Golovin, 145 Manton Dr.; Russell D. Moulton, 6316 Felder Dr., both of San Jose, Calif. 95123; Dale R. Shackle, 17135 Oak Leaf Dr., Morgan Hill, Calif. 95037; Bhuwon Pradhan, 3532 Aberdeen St., Santa Clara, Calif. 95054

[21] Appl. No.: 193,047
[22] PCT Filed: Jul. 22, 1993
[86] PCT No.: PCT/US93/06894
  § 371 Date: Feb. 4, 1994
  § 102(e) Date: Feb. 4, 1994
[87] PCT Pub. No.: WO94/02662
  PCT Pub. Date: Feb. 3, 1994
[51] Int. Cl.[6] .................................. H07M 10/40
[52] U.S. Cl. .............................. 429/192; 429/212
[58] Field of Search ........................ 429/192, 197, 429/212

[56] References Cited

U.S. PATENT DOCUMENTS

| | | | |
|---|---|---|---|
| 3,544,385 | 12/1970 | Newman | 429/197 |
| 4,840,858 | 6/1989 | Furukawa et al. | 429/197 |
| 5,037,713 | 8/1991 | Yoshino et al. | 429/197 X |
| 5,202,009 | 4/1993 | Andrieu et al. | 204/296 |
| 5,223,353 | 6/1993 | Ohsawa et al. | 429/192 |
| 5,346,787 | 9/1994 | Chaloner-Gill | 429/192 |

FOREIGN PATENT DOCUMENTS

| | | |
|---|---|---|
| 312236 | 4/1989 | European Pat. Off. . |
| 359524 | 3/1990 | European Pat. Off. . |
| 492858 | 7/1992 | European Pat. Off. . |
| 2640801 | 6/1990 | France . |
| 89/00771 | 1/1989 | WIPO . |
| 91/14294 | 9/1991 | WIPO . |

OTHER PUBLICATIONS

Sachiko et al. *Chemical Abstracts*, v. 114, No. 189175x, May 20, 1991, Corresponding to Jap. Kokai No. 03–8271.

Shishikura, *Patent Abstracts of Japan*, v. 12, No. 114 (E–677) Nov. 2, 1988, For Kokai No. 63–152885.

*Primary Examiner*—Stephen Kalafut

[57] ABSTRACT

This invention is directed to solid electrolytes containing a solvent and, in particular, a solvent comprising a mixture of an organic carbonate and triglyme as well as electrolytic cells prepared from such solid electrolytes. The electrolyte also contains an inorganic ion salt, preferably an alkali metal salt, and most preferably $LiPF_6$.

36 Claims, 6 Drawing Sheets

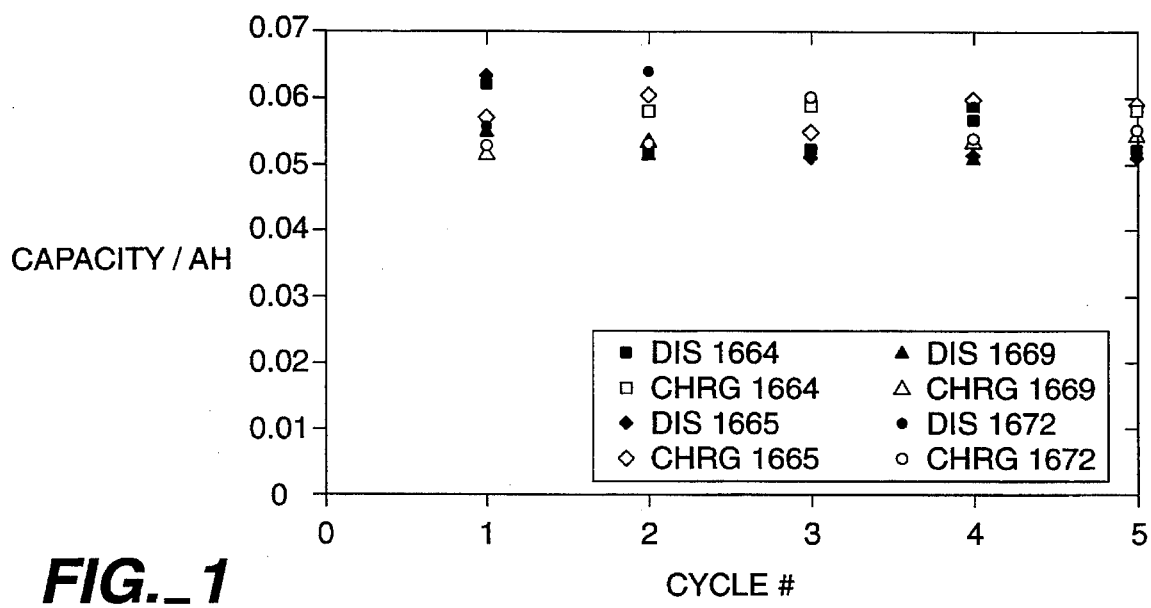
FIG._1
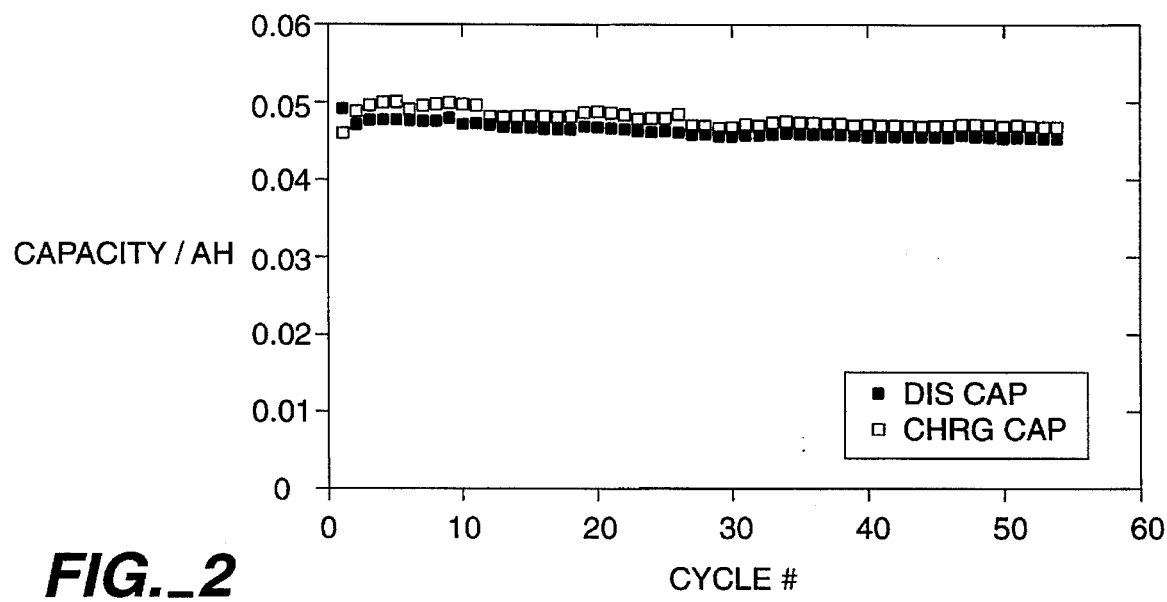
FIG._2

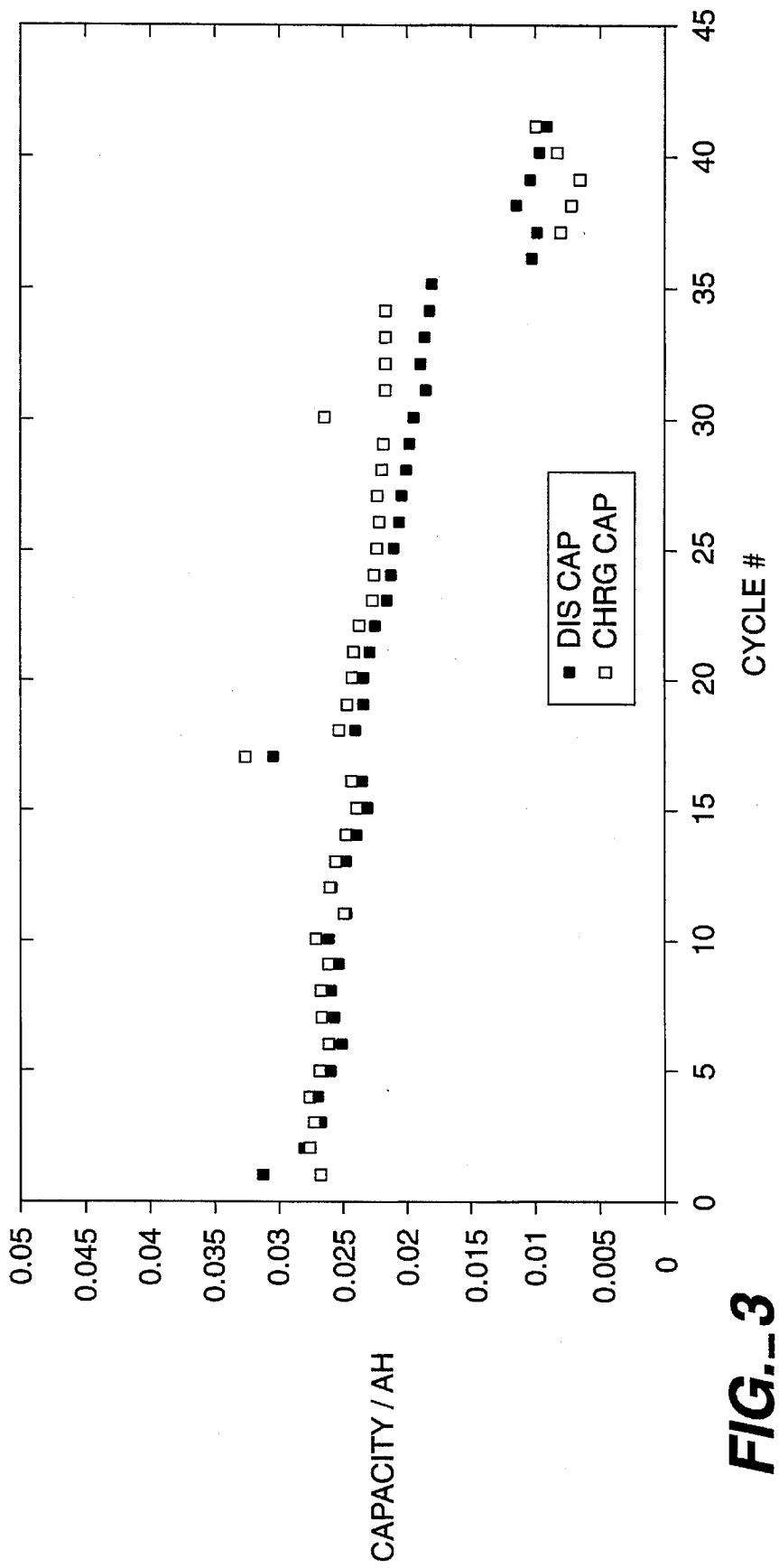
FIG._3

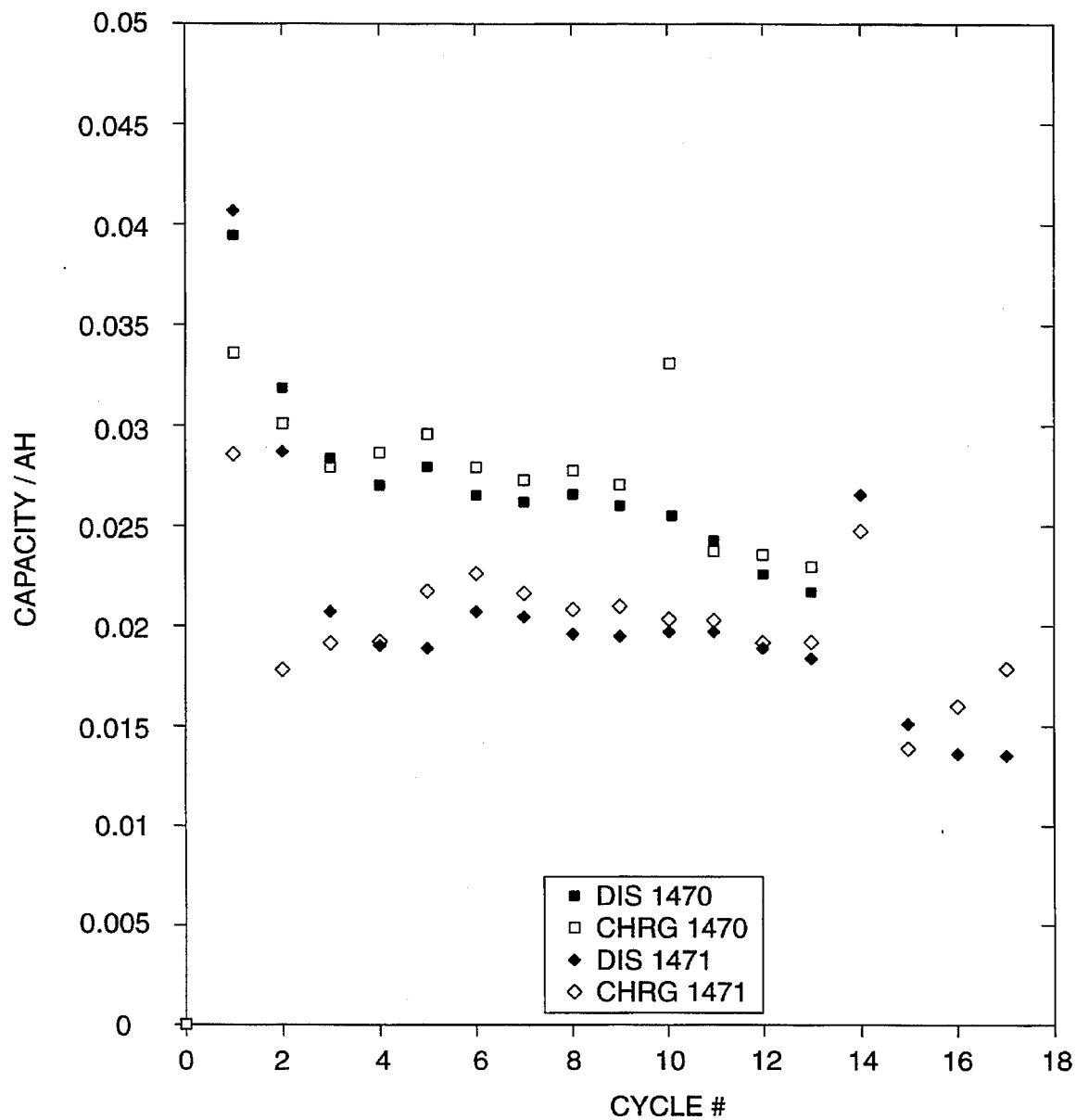
FIG._4

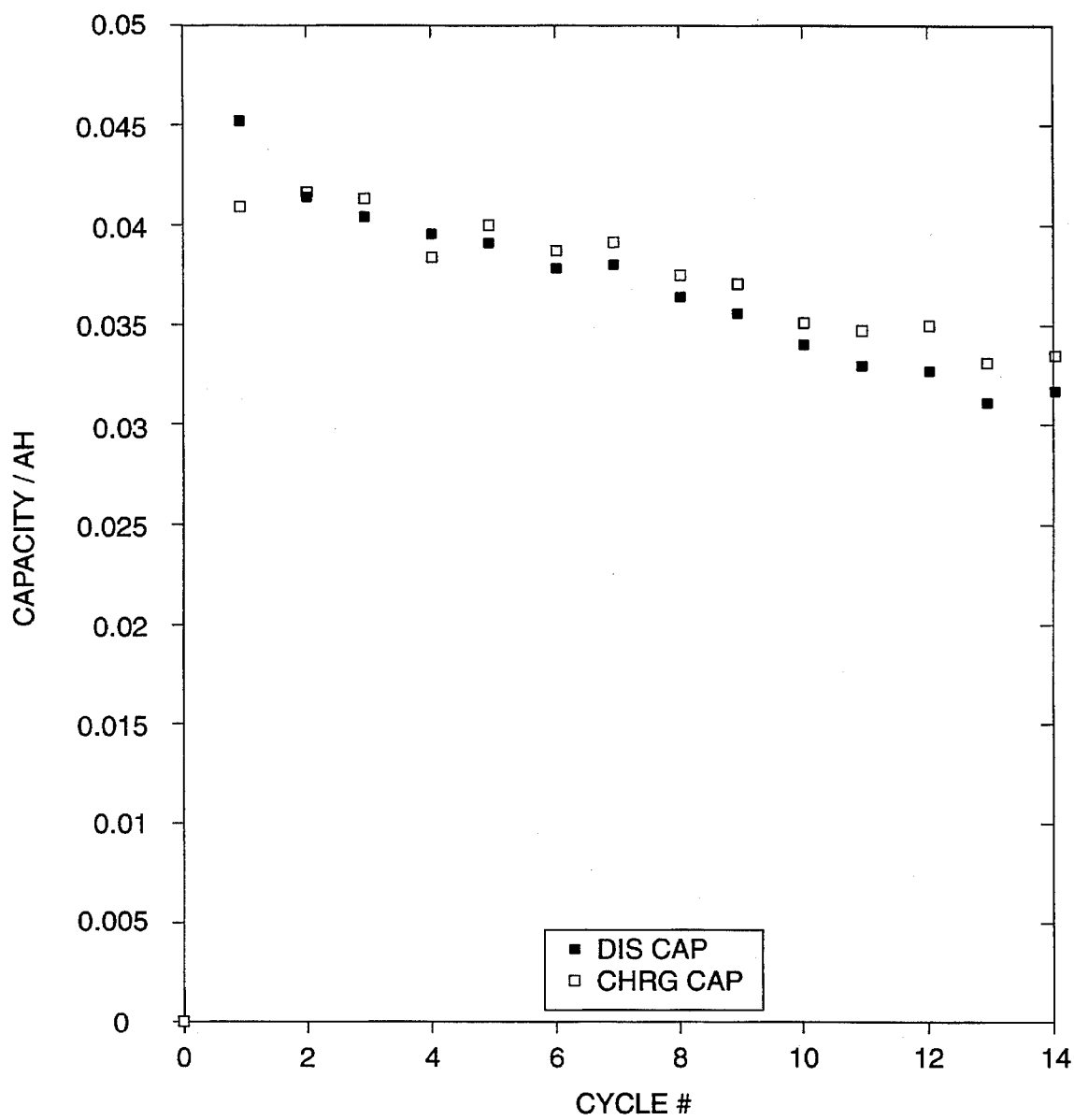
FIG._5

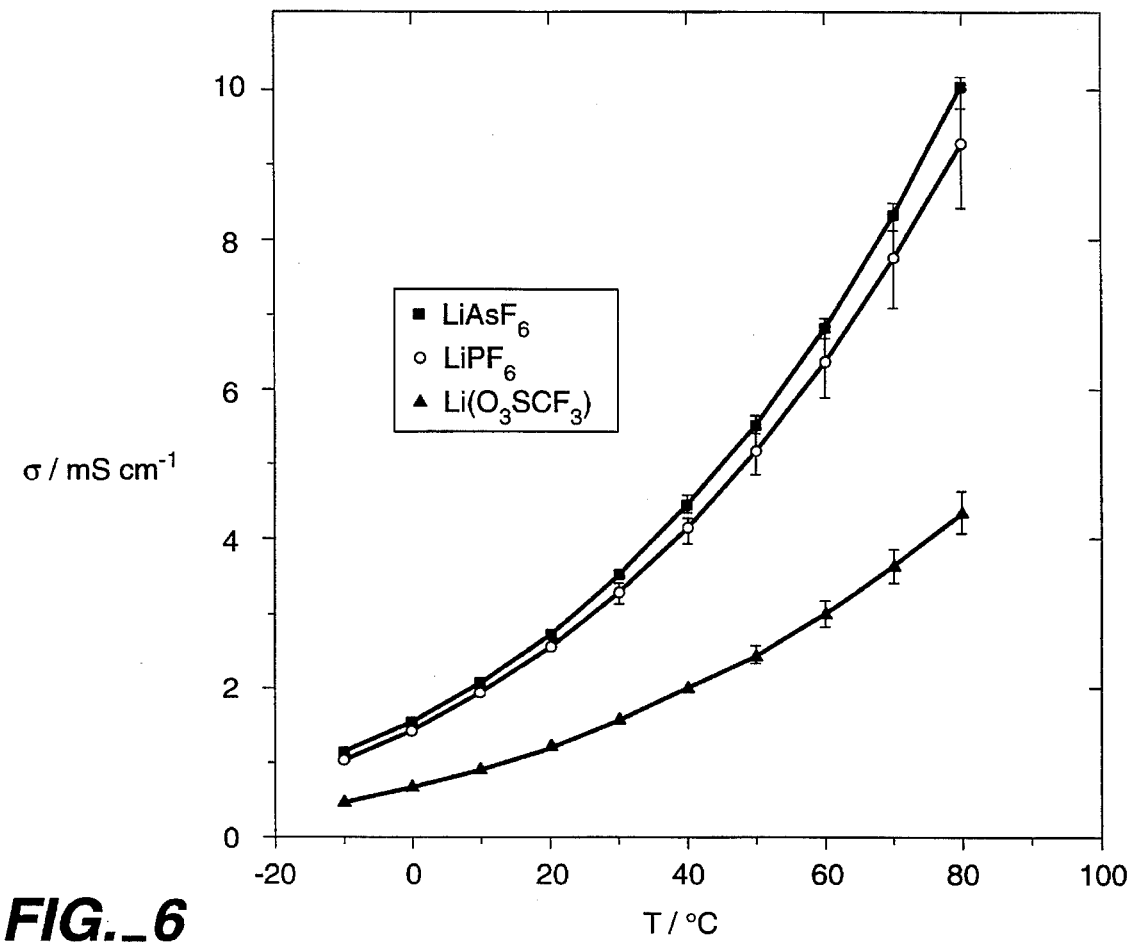
FIG._6

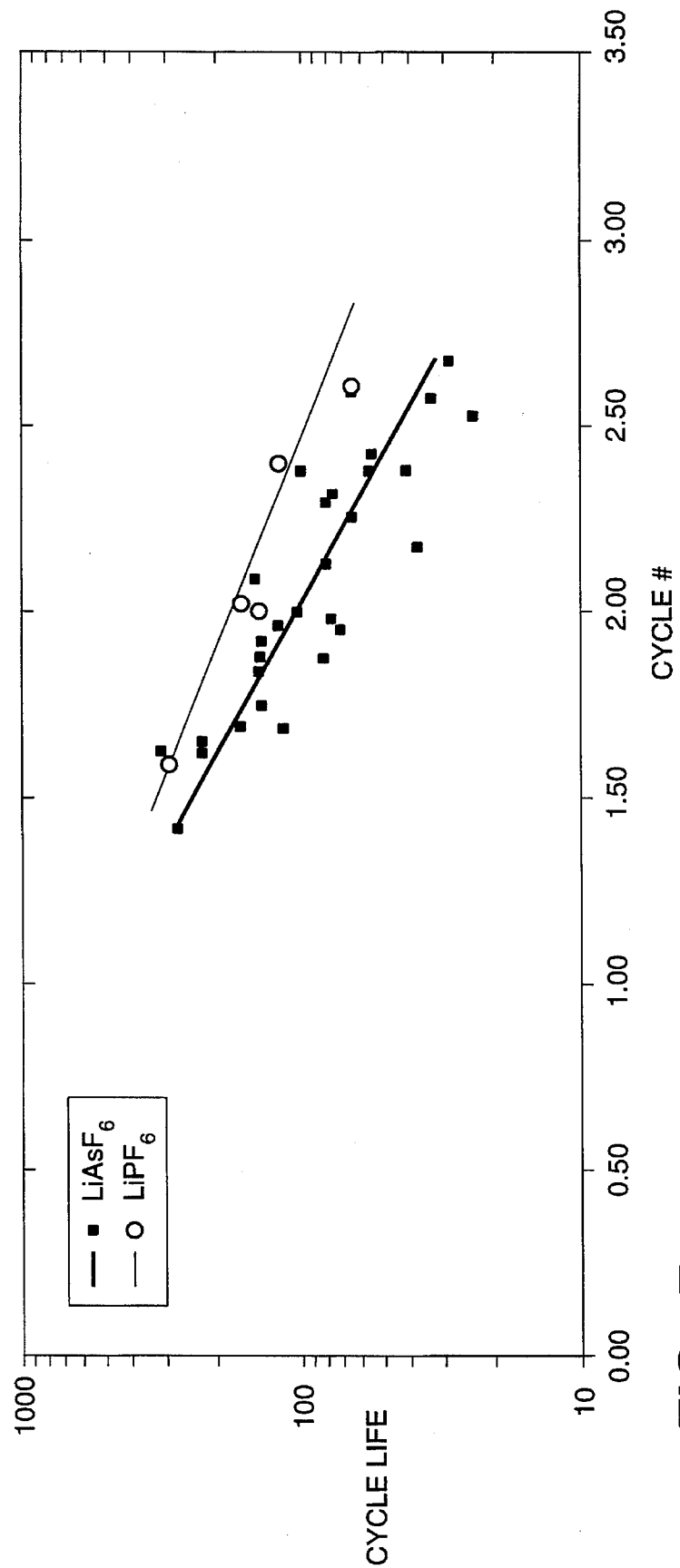

COMPOSITIONS AND METHODS FOR IMPROVING THE CUMULATIVE CAPACITY OF SOLID, SECONDARY ELECTROLYTIC CELLS

BACKGROUND OF THE INVENTION

1. Field of the Invention

This invention is directed to solid electrolytes which when employed in solid, secondary electrolytic cells impart enhanced cumulative capacity to the cells. In particular, the solid electrolytes of this invention comprise an electrolytic solvent mixture of triglyme, an organic carbonate, and inorganic ion salt.

2. State of the Art

Electrolytic cells comprising an anode, a cathode and a solid, solvent-containing electrolyte are known in the art and are usually referred to as "solid cells" or "solid batteries". These solid cells offer a number of advantages over electrolytic cells containing a liquid electrolyte (i.e., "liquid cells" or "liquid batteries") including improved safety features. Notwithstanding their advantages, the use of these solid cells over repeated charge/discharge cycles is substantially impaired because these cells typically exhibit significant drops in their charge and discharge capacity over repeated cycles as compared to their initial charge and discharge capacity.

Specifically, solid cells employ a solid electrolyte interposed between a cathode and an anode. The solid electrolyte contains either an inorganic or an organic matrix as well as a suitable alkali salt. The inorganic matrix may be non-polymeric (e.g., β-alumina, silver oxide, lithium iodide, etc.) or polymeric (e.g., inorganic [polyphosphazine] polymers) whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, ethylene oxide, propylene oxide, ethyleneimine, epichlorohydrin, ethylene succinate, urethane acrylate, and an acryloyl-derivatized polyalkylene oxide containing acryloyl group(s) of the formula $CH_2=CR'C(O)O-$ where R' is hydrogen or lower alkyl of from 1–6 carbon atoms.

Because of their expense and difficulty in forming into a variety of shapes, inorganic non-polymeric matrices are generally not preferred, and the art typically employs a solid electrolyte containing a polymeric matrix. Nevertheless, electrolytic cells comprising a solid electrolyte containing a polymeric matrix suffer from low ion conductivity, and, accordingly, in order to maximize the conductivity of these materials, the matrix is generally constructed into a very thin film, i.e., on the order of about 25 to about 250 μm. As is apparent, the reduced thickness of the film reduces the total amount of internal resistance within the solid electrolyte thereby minimizing losses in conductivity due to internal resistance.

The solid electrolytes also contain a solvent (plasticizer) which is typically added to the matrix in order to enhance the solubility of the inorganic ion salt, preferably an alkali ion salt, in the solid electrolyte and thereby increasing the conductivity of the electrolytic cell. In this regard, the solvent requirements of the electrolytic solvent used in the solid electrolyte are recognized in the art to be different from the solvent requirements in liquid electrolytes. For example, solid electrolytes require a lower solvent volatility as compared to the solvent volatilities permitted in liquid electrolytes.

Suitable electrolytic solvents for use in such solid electrolytes include propylene carbonate, ethylene carbonate, γ-butyrolactone, tetrahydrofuran, glyme (dimethoxyethane), diglyme, tetraglyme, dimethylsulfoxide, dioxolane, sulfolane and the like, U.S. Pat. Nos. 4,830,939 to Lee et al.; 4,908,283 to Takahashi et al.; 4,925,751 to Shackle et al.; 5,085,952 to North and 4,792,504 to Schwab.

Notwithstanding the above, the art is searching for more effective solvents and salts because the initial capacity of solid electrolytic cells is often less than desirable. Moreover, even when the initial capacity of the solid electrolytic cell is relatively high, such solid electrolytic cells often exhibit rapid decline in capacity over their cycle lives thereby reducing the cumulative capacity of the electrolytic cell.

Specifically, the cumulative capacity of a solid electrolytic cell is the summation of the capacity of a solid electrolytic cell during each cycle (charge and discharge) over a specified number of cycles. Solid electrolytic cells having a high initial capacity but which rapidly lose capacity over repeated cycles will have low cumulative capacity which, in turn, interferes with the effectiveness of these electrolytic cells for repeated use.

It would be advantageous if means were found to enhance the cumulative capacity of such solid electrolytic cells. It goes without saying that increases in the cumulative capacity of electrolytic cells would greatly facilitate their widespread commercial use in batteries.

SUMMARY OF THE INVENTION

The present invention is directed, in part, to the discovery that the use of specified mixtures of an organic carbonate and a triglyme of Formula I as the solvent in solid, single-phase, solvent-containing electrolytes provides for enhanced cumulative capacity when these electrolytes are used in solid, secondary electrolytic cells. The specific mixtures of organic carbonate and triglyme employed herein to achieve the desired enhancement in cumulative capacity are encompassed by weight ratios of organic carbonate to triglyme of from about 10:1 to 1:2.

The cumulative capacity is further enhanced when the inorganic ion salt in the electrolyte is an alkali metal salt, preferably $LiPF_6$.

Surprisingly, the enhancements in cumulative capacity achieved by the compositions of this invention are significantly diminished when either the solvent mixture is changed or different lithium (alkali) salts are employed.

Accordingly, in one of its composition aspects, this invention is directed to a solid, single-phase, solvent-containing electrolyte which comprises:

a solid polymeric matrix;

an inorganic ion salt (preferably an alkali metal ion salt); and a solvent comprising about a 10:1 to 1:2 weight ratio of an organic carbonate and a triglyme represented by Formula I:

$$RO(R_1O)_3R_2 \qquad \text{I}$$

where R and $R_2$ are independently selected from the group consisting of alkyl of from 1 to 6 carbon atoms, phenyl, alkphenyl of from 7 to 12 carbon atoms, and phenyl substituted with from 1 to 3 substituents selected from the group consisting of alkyl of from 1 to 4 carbon atoms, alkoxy of from 1 to 4 carbon atoms, chloro and bromo; and $R_1$ is —$(CR_3R_4CR_5R_6)$— where $R_3$, $R_4$, $R_5$ and $R_6$ are independently selected from the group consisting of hydrogen and alkyl of from 1 to 4 carbon atoms.

In the preferred solid, single-phase, solvent-containing electrolyte of this invention the inorganic ion salt is preferably an alkali metal salt, preferably $LiPF_6$.

In another of its composition aspects, the present invention is directed to a solid, secondary electrolytic cell which comprises:

an anode comprising a compatible anodic material;

a cathode comprising a compatible cathodic material; and interposed therebetween a solid, single-phase, solvent-containing electrolyte which comprises:

a solid polymeric matrix;

an inorganic ion salt (preferably alkali metal salt); and a solvent comprising about a 10:1 to 1:2 weight ratio of an organic carbonate and a triglyme represented by Formula I:

$$RO(R_1O)_3R_2 \qquad I$$

where R and $R_2$ are independently selected from the group consisting of alkyl of from 1 to 6 carbon atoms, phenyl, alkphenyl of from 7 to 12 carbon atoms, and phenyl substituted with from 1 to 3 substituents selected from the group consisting of alkyl of from 1 to 4 carbon atoms, alkoxy of from 1 to 4 carbon atoms, chloro and bromo; and $R_1$ is —$(CR_3R_4CR_5R_6)$— where $R_3$, $R_4$, $R_5$ and $R_6$ are independently selected from the group consisting of hydrogen and alkyl of from 1 to 4 carbon atoms.

In the preferred solid secondary electrolytic cell of this invention the inorganic ion salt is an alkali metal ion salt, and the preferred alkali metal salt is $LiPF_6$.

In one preferred embodiment, R and $R_2$ are methyl. In another preferred embodiment, $R_3$, $R_4$, $R_5$, and $R_6$ are each hydrogen or alkyl of from 1 to 2 carbon atoms. Most preferably, $R_1$ is ethylene, i.e., —$(CH_2CH_2)$—.

In still another preferred embodiment, the weight ratio of organic carbonate to the triglyme of Formula I is from about 6:1 to about 1:2; more preferably, from about 4:1 to about 1:2. Specifically, preferred weight ratios of organic carbonate to triglyme include a 4:1 ratio and a 1:1 ratio.

In yet another preferred embodiment, the organic carbonate is an aliphatic or an alicyclic carbonate. Preferably, the alicyclic carbonate is represented by a compound of the formula:

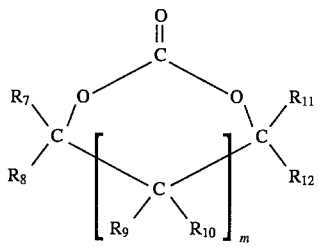

where each of $R_7$, $R_8$, $R_9$, $R_{10}$, $R_{11}$, and $R_{12}$ are independently selected from the group consisting of hydrogen and alkyl of from 1 to 2 carbon atoms, and m is an integer equal to 0 or 1. More preferably, the alicyclic carbonate is selected from the group consisting of propylene carbonate (m=0; $R_7$, $R_8$, and $R_{11}$ are hydrogen; and $R_{12}$ is methyl) and ethylene carbonate (m=0; and $R_7$, $R_8$, $R_{11}$, and $R_{12}$ are hydrogen).

Preferably, the aliphatic carbonate is represented by a compound of the formula:

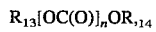

$$R_{13}[OC(O)]_nOR_{14}$$

where $R_{13}$ and $R_{14}$ are independently selected from the group consisting of alkyl of from 1 to 4 carbon atoms and n is an integer of from 1 to 2.

In one of its method aspects, the present invention is directed to a method for enhancing the cumulative capacity of a solid, secondary electrolytic cell which comprises employing the solid, single-phase, solvent-containing electrolyte described above in the electrolytic cell.

BRIEF DESCRIPTION OF THE DRAWINGS

FIG. 1 illustrates the capacity per amp hour (Ah) over several cycles for an electrolytic cell which comprises a lithium anode; a cathode comprising $V_6O_{13}$; and interposed therebetween a solid, solvent-containing electrolyte which comprises a cured product of a composition comprising urethane acrylate, a solvent mixture (1:1 weight ratio) of ethylene carbonate and triglyme [$CH_3O(CH_2CH_2O)_3CH_3$], and $LiAsF_6$ (alkali metal ion salt).

FIG. 2 illustrates the capacity per amp hour (Ah) over several cycles for an electrolytic cell which comprises a lithium on nickel anode; a cathode comprising $V_6O_{13}$; and interposed therebetween a solid, solvent-containing electrolyte which comprises a cured product of a composition comprising urethane acrylate, a solvent mixture (4:1 weight ratio) of propylene carbonate and triglyme [$CH_3O(CH_2CH_2O)_3CH_3$], and $LiAsF_6$ (alkali metal ion salt).

FIG. 3 illustrates the capacity per amp hour (Ah) over several cycles for an electrolytic cell which comprises a lithium on nickel anode; a cathode comprising $V_6O_{13}$; and interposed therebetween a solid, solvent-containing electrolyte which comprises a cured product of a composition comprising urethane acrylate, propylene carbonate (solvent) and $LiAsF_6$ (alkali metal ion salt).

FIG. 4 illustrates the capacity per amp hours (Ah) over several cycles for an electrolytic cell which comprises an anode comprising lithium; a cathode comprising $V_{6l\ O13}$; and interposed therebetween a solid, solvent-containing electrolyte which comprises a cured product of a composition comprising polyethylene glycol diacrylate, $LiAsF_6$ (alkali metal ion salt), and propylene carbonate (solvent).

FIG. 5 illustrates the capacity per amp hours (Ah) over several cycles for an electrolytic cell which comprises an anode comprising lithium; a cathode comprising $V_6O_{13}$; and interposed therebetween a solid, solvent-containing electrolyte which comprises a cured product of a composition comprising polyethylene glycol diacrylate, $LiAsF_6$ (alkali metal ion salt), and ethylene carbonate (solvent).

In FIGS. 1 to 5, all electrolytic cells were tested at about 1 mA/cm$^2$ and between about 1.8 and 3.0 volts.

FIG. 6 graphically illustrates the effect of using three different lithium salts on the conductivity (reported as σ/mSCm$^{-1}$) as a function of temperature (°C.), in similar electrolytic cells.

FIG. 7 graphically compares the specific capacity (mAh/cm$^2$) against cycle life for an electrolytic cell employing a solid, solvent-containing electrolyte which contains $LiAsF_6$ salt and a solvent mixture (4:1 weight ratio) of propylene carbonate and triglyme [CH$_3$O(CH$_2$CH$_2$O)$_3$CH$_3$] as compared to an electrolytic cell employing a solid, solvent-containing electrolyte which contains LiPF$_6$ salt and a solvent mixture (4:1 weight ratio) of propylene carbonate and triglyme.

DETAILED DESCRIPTION OF THE PREFERRED EMBODIMENTS

As noted above, this invention is directed to solid, solvent-containing electrolytes which, by virtue of the solvent and salt employed, provide for enhanced cumulative capacity when used in a solid electrolytic cell. However, prior to describing this invention is further detail, the following terms will first be defined.

Definitions

As used herein, the following terms have the following meanings.

The term "solid polymeric matrix" or "solid matrix" refers to an electrolyte compatible material formed by polymerizing an inorganic or organic monomer (or partial polymers thereof) and which, when used in combination with the other components of the electrolyte, renders the electrolyte solid. The solid matrix may or may not be ion-conducting. Preferably, however, the solid matrix is capable of ionically conducting inorganic cations (e.g., alkali ions).

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985.

The term "a solid matrix forming monomer" refers to inorganic or organic materials which in monomeric form can be polymerized to form solid polymeric matrices and which, when polymerized in the presence of the electrolytic solvent, form solid matrices which are suitable for use as solid electrolytes in electrolytic cells. Suitable solid matrix forming monomers are well known in the art, and the particular monomer employed is not critical.

Preferably, the solid matrix forming monomers contain hetero atom functionalities capable of forming donor acceptor bonds with the cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine

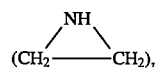

ethylene oxide

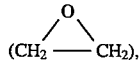

epichloro hydrine

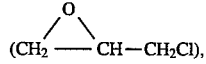

acryloyl-derivatized polyalkylene oxides (as disclosed in U.S. Pat. No. 4,908,283), urethane acrylate, vinyl sulfonate polyalkylene oxides (as disclosed in U.S. patent application Ser. No. 07/918,438 filed on Jul. 22, 1992 and incorporated herein by reference), acrylic acid (CH$_2$=CHCOOH), chloroacrylic acid (ClCH=CHCOOH), bromoacrylic acid (BrCH=CHCOOH), crotonic acid (CH$_3$CH=CHCOOH), propylene (CH$_3$CH=CH$_2$), ethylene (CH$_2$=CH$_2$) and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of the LiPF$_6$ salt and a solvent mixture of an organic carbonate and a triglyme compound of Formula I above, to form solid polymeric matrices which are suitable for use as solid electrolytes in electrolytic cells.

The term "prepolymer" refers to solid matrix forming monomers and/or partial polymers thereof. Urethane acrylates are the preferred prepolymers. Urethanes are the reaction product of dihydric and polyhydric alcohols, i.e., diols and polyols, with diisocyanates. The diols and polyols may be alkoxylated. A preferred diol for the urethane of the present invention is hexane diol.

The term "cured" or "cured product" refers to the treatment of prepolymers under polymerization conditions so as to form a solid polymeric matrix. The resulting cured product can include cross-linking between polymer backbones.

Suitable polymerization conditions are well known in the art and include, by way of example, heating the monomer, irradiating the monomer with UV light, electron beams, etc. Examples of cured products suitable for use in this invention are set forth in U.S. Pat. Nos. 4,830,939 and 4,990,413.

The solid matrix forming monomer or partial polymer can be cured or further cured prior to or after addition of the inorganic ion salt and the organic carbonate/triglyme solvent. For example, a composition comprising requisite amounts of the solid matrix forming monomer, salt and organic carbonate/triglyme solvent can be applied to a substrate and then cured. Alternatively, the solid matrix forming monomer can be first cured and then dissolved into a suitable volatile solvent. Requisite amounts of the salt and organic carbonate/triglyme solvent can then be added. The mixture is then placed on a substrate, and removal of the volatile solvent results in formation of a solid electrolyte. In either case, the resulting solid electrolyte is a homogeneous, single-phase product which is maintained upon curing or evaporation and does not readily separate upon cooling to temperatures below room temperature. Accordingly, the solid electrolyte of this invention does not include a separator as is typical of liquid electrolytes.

The term "inorganic ion salt" refers to any inorganic salt which is suitable for use in a solid electrolyte. The particular inorganic ion salt employed is preferably an alkali ion salt, and examples of suitable inorganic ion salts include, by way of example, $LiClO_4$, LiI, LiSCN, $LiBF_4$, $LiAsF_6$, $LiCF_3SO_3$, $LiPF_6$, NaI, NaSCN, KI, $C_3SCN$, $AgNO_3$, $CuCl_2$, $Mg(ClO_4)_2$ and the like. Preferably the inorganic ion salt comprises from about 5 to about 25 weight percent of the electrolyte based on the total weight of the electrolyte, more preferably from about 7 to about 15 weight percent, and most preferably from about 9 to about 11 weight percent.

The term "lithium hexafluorophosphate" refers to the $LiPF_6$ salt and any hydrates thereof. Preferably, the lithium hexafluorophosphate salt is anhydrous.

The term "organic carbonate" refers to hydrocarbyl carbonate compounds of no more than about 12 carbon atoms and which do not contain any hydroxyl groups. Preferably, the organic carbonate is an alicyclic or an aliphatic carbonate.

In a more preferred embodiment, the alicyclic carbonate is represented by the formula:

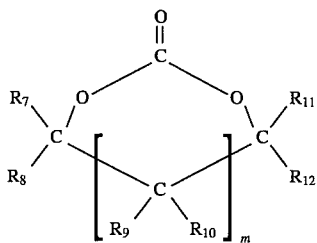

where each of $R_7$, $R_8$, $R_9$, $R_{10}$, and $R_{11}$, and $R_{12}$ are independently selected from the-group consisting of hydrogen and alkyl of from 1 to 2 carbon atoms, and m is an integer equal to 0 or 1.

In a particularly preferred embodiment, m is equal to zero and $R_7$, $R_8$, and $R_{11}$, are equal to hydrogen and $R_{12}$ is equal to hydrogen (ethylene carbonate), —$CH_3$ (propylene carbonate) or —$CH_2CH_3$ (butylene carbonate).

Suitable alicyclic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; spiro[1,3-oxa-2-cyclohexanone-5', 5'-1', 3'-oxa-2'-cyclohexanone]; and 1,3-dioxolen-2-one (i.e.,

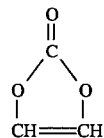

Several of these alicyclic carbonates are commercially available, such as propylene carbonate and ethylene carbonate. Alternatively, the alicyclic carbonates can be readily prepared by well known reactions. For example, reaction if phosgene with a suitable alkane-α,β-diol (dihydroxy alkanes having hydroxyl substituents on adjacent carbon atoms) or an alkan-α,γ-diol (dihydroxy alkanes having hydroxyl substituents on carbon atoms in a 1,3 relationship) yields an alicyclic carbonate for use within the scope of this invention. See, for instance, U.S. Pat. No. 4,115,206, which is incorporated herein by reference in its entirety.

Likewise, the alicyclic carbonates useful for this invention may be prepared by transesterification of a suitable alkane-α,β-diol or an alkan-α,γ-diol with, e.g., diethyl carbonate under transesterification conditions. See, for instance, U.S. Pat. Nos. 4,384,115 and 4,423,205 which are incorporated herein by reference in their entirety.

Additional suitable alicyclic carbonates are disclosed in U.S. Pat. No. 4,747,850 which is also incorporated herein by reference in its entirety.

In another preferred embodiment, the aliphatic carbonates are represented by the formulae:

$$R_{13}[OC(O)]_nOR_{14} \text{ and } R_{13}[OC(O)R_{15}]_pOC(O)R_{14}$$

where each $R_{13}$ and $R_{14}$ are independently selected from the group consisting of alkyl of from 1 to 4 carbon atoms; $R_{15}$ is an alkylene group of from 2 to 4 carbon atoms; n is an integer of from 1 to 2, and p is an integer from 1 to 4.

Most preferably, the aliphatic carbonate is a carbonate of the formula:

$$R_{13}[OC(O)]_nOR_{14}$$

where $R_{13}$, $R_{14}$ and n are as defined above.

Aliphatic carbonates are well known in the art, and a variety of aliphatic carbonates are commercially available. Additionally, the aliphatic carbonates can be prepared by transesterification of a suitable alcohol (e.g., $R_{13}OH$ and $R_{14}OH$) with, e.g., diethyl carbonate under transesterification conditions.

The term "solid, secondary electrolytic cell" refers to a composite electrolytic cell comprising an anode, a solid, solvent-containing electrolyte and a cathode comprising a cathodic material capable of repeated discharge/charge cycles so as to permit repeated reuse wherein the electrolyte is interposed between the anode and the cathode.

The anode is typically comprised of a compatible anodic material which is any material which functions as an anode in a solid, secondary electrolytic cell. Such compatible anodic materials are well known in the art and include, by way of example, lithium, lithium alloys, such as alloys of lithium with aluminum, mercury, zinc, and the like, and intercalation based anodes such as carbon, tungsten oxides, and the like.

The cathode comprises a compatible cathodic material which is any material which functions as a positive pole (cathode) in a solid, secondary electrolytic cell and which is capable of being recharged (recycled). Such compatible cathodic materials are well known in the art and include, by way of example, manganese dioxide, molybdenum trioxide, vanadium oxides such as $V_6O_{13}$, $LiV_3O_8$, $V_2O_5$, and the like, sulfides of titanium, molybdenum and niobium, and the like, chromium oxide, copper oxide, $LiCoO_2$, $LiMnO_2$, etc. The particular compatible cathodic material employed is not critical.

Preferably, the cathode is derived from a cathode paste comprising the compatible cathodic material and an electroconductive material including, by way of example, graphite, powdered carbon, powdered nickel, metal particles, conductive polymers (i.e., characterized by a conjugated network of double bonds like polypyrrole, polythiophene, polyaniline, and polyacetylene), and the like.

In a particularly preferred embodiment, the cathode is prepared from a cathode paste which comprises:

from about 35 to 65 weight percent of a compatible cathodic material;

from about 1 to 20 weight percent of an electroconductive material as described above;

from about 0 to 20 weight percent of a polyalkylene oxide film forming agent comprising repeating units of

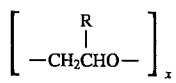

where R is hydrogen or alkyl of from 1 to 3 carbon atoms and x is an integer such that the number average molecular weight of the film forming agent is at least about 100,000 and preferably from about 100,000 to about 5,000,000 and even more preferably from about 500,000 to about 750,000;

from about 10 to 50 weight percent of electrolytic solvent which comprises about a 10:1 to 1:2 weight ratio of an organic carbonate and a triglyme represented by Formula I described above; and from at least about 5 weight percent to about 30 weight percent of a prepolymer, wherein all weight percents are based on the total weight of the cathode.

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art, some of which are commercially available. A particularly preferred current collector for the cathode is a roughened nickel (electrolytically deposited nickel) on nickel current collector (available as CF18/NiT from Fukuda Metal Foil & Powder Company, Ltd., Kyoto, Japan). Another preferred current collector is aluminum foil to which an adhesive layer has been applied. Such adhesive layers are described in the examples below as well as in U.S. patent application Ser. No. 07/968,155, filed on Oct. 29, 1992 and which is incorporated herein by reference in its entirety.

The current collectors are preferably attached to the surface of the cathode not facing the electrolyte but can also be attached to the anode. When the current collector is attached to the cathode, the cathode is interposed between the electrolyte and the current collector.

In still another preferred embodiment, the electrolyte solvent and the cathode solvent are identical.

Methodology

Methods for preparing solid, solvent-containing electrolytes are well known in the art. This invention, however, utilizes a particular solvent (plasticizer) mixture in the preparation of solid electrolytes which solvent mixture provides unexpected enhancements in the cumulative capacity of solid electrolytic cells utilizing these solid electrolytes.

The solvent mixture employed herein comprises about a 10:1 to 1:2 weight ratio of an organic carbonate and a triglyme of Formula I above. Preferably, the weight ratio of organic carbonate and triglyme of Formula I is from about 6:1 to 1:2, more preferably from about 4:1 to 1:2. Specifically preferred weight ratios of organic carbonate to triglyme include a 4:1 weight ratio and a 1:1 weight ratio.

As noted above, organic carbonates are either commercially available or can be prepared by art recognized methods.

Similarly, triglymes of Formula I above are also either commercially available or can be prepared by art recognized methods. For example, the preparation of $RO(CR_3R_4CR_5R_6O)_3OH$ compounds, where R, $R_3$, $R_4$, $R_5$ and $R_6$ are as defined above, can be readily prepared by reaction of an ethylene oxide derivative (an oxide derived from $CR_3R_4$=$CR_5R_6$ by conventional methods) with ROH under polymerization conditions. See, for example, U.S. Pat. No. 4,695,291 which is incorporated herein by reference. Careful control of the stoichiometry (3 moles of the ethylene oxide derivative to 1 mole of ROH) and reaction conditions will result in formation of a mixture of compounds of the formula $RO(CR_3R_4CR_5R_6O)_sOH$ wherein the mixture will contain a substantial amount of the compound where s=3 as well as other polymers, i.e., s=2, s=4, etc. The polymer where s=3 can then be separated from the reaction mixture by conventional methods including distillation, column chromatography, high performance liquid chromatography (HPLC), and the like. Alkylation of this compound to provide for compounds of Formula I can be readily accomplished by known methods including, by way of example, treatment with metallic sodium followed by addition of $R_2Cl$.

The specific solvent mixture of organic carbonate and triglyme is selected so as to be radiation inert, at least up to the levels of radiation employed, if the solid polymeric matrix for the electrolyte is formed by radiation polymerization of the prepolymer. If the solid polymeric matrix of the electrolyte is formed by thermal polymerization, then the specific solvent mixture of organic carbonate and triglyme is selected to be thermally inert at least up to the temperatures of thermal polymerization. Additionally, the solvent should not scavenge free radicals. The specific solvent mixture of organic carbonate and triglyme is preferably selected to be non-volatile—that is to say that the solvent mixture should preferably not include any components having a boiling point of less than about 85° C.

The solid, solvent-containing electrolyte is then preferably prepared by combining the inorganic ion salt, preferably an alkali metal ion salt and most preferably the $LiPF_6$ salt, a prepolymer and the solvent mixture of an organic carbonate and the triglyme of Formula I to form an electrolyte solution. Optionally, a film forming agent such as a polyalkylene oxide film forming agent comprising repeating units of

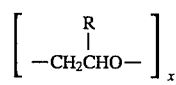

where R is hydrogen or alkyl of from 1 to 3 carbon atoms and x is an integer such that the number average molecular weight of the film forming agent is at least about 100,000 and preferably from about 100,000 to about 5,000,000 and even more preferably from about 500,000 to about 750,000, can be incorporated into the electrolyte solution.

In a preferred embodiment, the resulting electrolyte solution comprises:

from about 40 to 80 weight percent electrolyte solvent (i.e., the solvent mixture of the organic carbonate and the triglyme) based on the weight of the electrolyte solution, preferably from about 60 to 80 weight percent, and even more preferably from about 60 to 70 weight percent;

from about 5 to 30 weight percent of prepolymer based on the weight of the electrolyte solution, preferably from about 10 to 25 weight percent, and even more preferably from about 17 to 22 weight percent; and from about 5 to about 25 weight percent of an inorganic ion salt, preferably an alkali salt and most preferably the $LiPF_6$ salt, based on the weight of the electrolyte solution, preferably from about 7 to 15 weight percent of salt, and even more preferably from about 9 to 11 weight percent of salt.

When a polyalkylene oxide film forming agent is employed, it is preferably employed at from about 1 to 10 weight percent based on the weight of the electrolyte solution, more preferably from about 1 to 5 weight percent, and still more preferably from about 2.5 to 3.5 weight percent.

Also, when the electrolyte solution employs a polyalkylene oxide film forming agent, it is preferably mixed in the manner described in Examples 3 through 5 below as well as in U.S. patent application Ser. No. 08/049,200 filed Apr. 19, 1993 which application is incorporated herein by reference in its entirety.

The resulting solution is then uniformly coated onto a suitable substrate (e.g., aluminum foil, a glass plate, a lithium anode, a cathode, etc.) by means of a roller, a doctor blade, a bar coater, a silk screen or spinner to obtain a film of this solution over the substrate.

In order to enhance its application of the electrolyte solution onto the substrate, this solution is preferably a liquid and even more preferably has a viscosity of from about 500 to about 10,000 centipoise at 25° C. and still more preferably has a viscosity of from about 1000 to about 4000 centipoise at 25° C. In some cases, it may be necessary to heat the solution so as to reduce the viscosity of the solution thereby providing for a coatable material.

Preferably, the amount of electrolyte solution coated onto the substrate is an amount sufficient so that after curing, the resulting solid, solvent-containing electrolyte has a thickness of no more than about 250 microns ($\mu m$). Preferably, the solid, solvent-containing electrolyte has a thickness of from about 25 to about 250 microns, more preferably from about 50 to about 150 microns, and even more preferably from about 50 to about 80 microns.

The composition is cured by conventional methods to form a solid, solvent-containing electrolyte. For example, when the prepolymer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like). When curing is by UV radiation, the initiator is typically benzophenone, Darocur 1173 (Ciba Geigy, Ardlesy, N.Y. U.S.A.), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

In an alternative embodiment, the solid polymeric matrix (e.g., formed by polymerization of a prepolymer) can be dissolved into a suitable volatile solvent, and the requisite amounts of the inorganic salt, preferably an alkali salt, and most preferably the $LiPF_6$ salt, and solvent mixture of an organic carbonate and a triglyme of Formula I are then added. The mixture is then applied onto a suitable substrate (e.g., the surface of the cathode opposite to the current collector) in the manner set forth above and the volatile solvent removed by conventional techniques (e.g., evaporation) to provide for a solid, single-phase electrolyte. Suitable volatile solvents preferably have a boiling point of less than 85° C. and more preferably between about 45° and 85° C. Particularly preferred volatile solvents are aprotic solvents. Examples of suitable volatile solvents include acetonitrile, tetrahydrofuran, and the like. However, acetonitrile is not preferred if it is to contact the anode.

In still another alternative embodiment, the liquid electrolyte composition containing such prepolymers can be applied over a layer of cathode paste which itself is formed over a layer of electrically-conducting adhesion-promoter found on a metal foil. Both the cathode paste and the liquid electrolyte composition are simultaneously cured by exposure to, for example, electron beams so as to provide for a cured composite containing both the cured cathode and the cured electrolyte.

In any case, the resulting solid electrolyte is a homogeneous, single-phase material which is maintained upon curing, and does not readily separate upon cooling to temperatures below room temperature. See, for example, U.S. Pat. No. 4,925,751 which is incorporated herein by reference in its entirety.

Additionally, it may be desirable to avoid the use of protic materials which will be incorporated into the electrolyte of the electrolytic cell. If such removal is desired, then most of the protic inhibitors in di- and tri-acrylate monomers as well as in the urethane acrylate prepolymers are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrolytic cell comprises the steps of coating the surface of a cathode with an electrolyte solution comprising a prepolymer, an inorganic ion salt, preferably an alkali salt, most preferably the $LiPF_6$ salt, a polyalkylene oxide film forming agent, and the solvent mixture of an organic carbonate and a triglyme compound of Formula I at the amounts recited above. The solution is then cured to provide for a solid electrolyte composition on the cathodic surface. The anode (e.g., a lithium foil) is then laminated to this composite product in such a way that the solid electrolyte is interposed between the lithium foil and the cathodic material.

This process can be reversed so that the surface of an anode is coated with this electrolyte solution which is then cured to provide for a solid electrolyte composition on the anodic surface. The cathode is then laminated to this composite product in such a way that the solid electrolyte is interposed between the lithium foil and the cathodic material.

Methods for preparing solid electrolytes and electrolytic cells are also set forth in U.S. Pat. Nos. 4,830,939 and 4,925,751 which are incorporated herein by reference in their entirety.

Utility

The solid, solvent-containing electrolytes described herein are particularly useful in preparing solid, secondary electrolytic cells having improved cumulative capacity compared to solid, secondary electrolytic cells containing solid, solvent-containing electrolytes containing either only an organic carbonate or a triglyme of Formula I as the solvent or which contain other salts.

Additionally, it is contemplated that, in some cases (e.g., with propylene carbonate/triglyme mixtures), the solid, solvent-containing electrolytes of this invention may also enhance the cycle life of the electrolytic cell.

The following examples are offered to illustrate the present invention and should not be construed in any way as limiting its scope.

EXAMPLES

Examples 1–2 and Comparative Examples A, B and C are presented to illustrate the improvements in cumulative capacity using the organic carbonate/triglyme solvent mixture in the electrolyte as compared to prior art solvents used in the electrolyte.

Example 5 is presented to illustrate the improvements obtained in cumulative capacity using the $LiPF_6$ salt as opposed to the $LiAsF_6$ salt and the fact that the use of the $LiPF_6$ salt is not detrimental to the conductivity of the electrolytic cell as compared to the $LiAsF_6$ salt.

Example 1

Four different solid electrolytic cells containing a 1:1 mixture of ethylene carbonate/$CH_3O(CH_2CH_2O)_3CH_3$ (triglyme) as the solvent for both the electrolyte and the cathode were prepared. The charge and discharge capacity of these electrolytic cells over several cycles were measured.

The solid electrolytic cells were prepared by first preparing a cathodic paste which was spread onto a substrate (e.g., a current collector) and then cured to provide for the cathode. An electrolyte composition was then placed onto the cathode surface and cured to provide for the solid electrolyte. Then the anode was laminated onto the solid electrolyte to provide for a solid electrolytic cell. The specifics of this construction are as follows:

A. The Cathode

The cathode was prepared from a cathodic paste which, in turn, was prepared from a cathode powder as follows:

i. Cathode Powder

The cathode powder was prepared by combining 90.44 weight percent $V_6O_{13}$ (prepared by heating ammonium metavanadate [$NH_4^+VO_3^-$] at 450° C. for 16 hours under $N_2$ flow) and 9.56 weight percent of carbon (from Chevron Chemical Company, San Ramon, Calif., U.S.A. under the trade name of Shawinigan Black™). About 100 grams of the resulting mixture was placed into a grinding machine (Attritor Model S-1 purchased from Union Process, Akron, Ohio, U.S.A.) and ground for 30 minutes. Afterwards, the resulting mixture was dried at about 260° C. for 16 hours to provide a cathode powder.

The above mixing procedure was repeated until the entire sample was mixed so as to provide for 292 grams of cathode powder.

ii. Cathode Paste

A cathode paste was prepared by combining sufficient cathode powder to provide for a final product having 45 weight percent $V_6O_{13}$.

Specifically, about 28.71 grams of unground carbon (from Chevron Chemical Company, San Ramon, Calif., U.S.A. under the trade name of Shawinigan Black™) was combined in a glove box (under dry [<10 ppm $H_2$] argon at ambient temperature and pressure) with about 57.2 grams of the 1:1 mixture of ethylene carbonate/triglyme, and the resulting composite was mixed under dry argon and at ambient temperature and pressure on a double planetary mixer (Ross #2 mixer available from Charles Ross & Sons, Company, Hauppag, N.Y., U.S.A.) at about 20 rpms until a paste was formed.

About 248.77 grams of a cathode powder prepared in a manner similar to that described above was added to the mixer along with an additional 57.2 grams of the 1:1 mixture of ethylene carbonate/triglyme, and the resulting composite was mixed under dry argon and at ambient temperature and pressure on a double planetary mixer at about 20 rpms until a dry paste was formed.

About 5 grams of polyethylene oxide (number average molecular weight about 600,000 available as Polyox WSR-205 from Union Carbide Chemicals and Plastics, Danbury, Conn., U.S.A.), about 42.9 grams of polyethylene glycol diacrylate (molecular weight about 400 available as SR-344 from Sartomer Company, Inc., Exton, Pa., U.S.A.) and containing less than about 50 ppm of inhibitor, and about 7.6 grams of ethoxylated trimethylpropane triacrylate (TMP-EOTA) (molecular weight about 450 available as SR-454 from Sartomer Company, Inc., Exton, Pa., U.S.A.) and containing less than about 50 ppm of inhibitor were added to about 57.2 grams of a 1:1 mixture of triglyme/ethylene carbonate and this mixture added to the mixer.

The resulting slurry in the mixer was heated at about 65° C. while mixing for 2 hours at 60 rpms to provide for the cathodic paste which had the following approximate weight percent of components:

| | |
|---|---|
| $V_6O_{13}$ | 45 weight percent |
| Carbon | 10 weight percent |
| ethylene carbonate/triglyme | 34 weight percent |
| polyethylene oxide | 1 weight percent |
| polyethylene glycol diacrylate[1] | 8.5 weight percent |
| ethoxylated trimethylpropane triacrylate[1] | 1.5 weight percent |

[1]Inhibitor was removed from both the polyethylene glycol diacrylate and ethoxylated trimethylpropane triacrylate by contacting each of these compounds with an Inhibitor Remover available as Product No. 31,133-2 from Aldrich Chemical, Milwaukee, Wisconsin, U.S.A. which results in less than 50 ppm of inhibitor in the product.

In an alternative embodiment, the requisite amounts of all of the cathodic materials other than the cathode powder can be combined to form a first mixture, and this first mixture is combined with the cathode powder to form a second mixture. This second mixture is then thoroughly mixed to provide for the cathode paste.

The cathode paste prepared as above was placed onto a sheet (about 1 mil [~25 μm] thick by 10 cm wide) of a roughened nickel on nickel current collector (available as CF18/NiT from Fukuda Metal Foil & Powder Company, Ltd., Kyoto, Japan). A Mylar cover sheet was then placed over the paste, and the paste was spread to a thickness of about 90 microns (μm) with a conventional plate and roller system and cured by continuously passing the sheet through an electron beam apparatus (Electrocurtain, Energy Science Inc., Wolburn, Mass., U.S.A.) at a voltage of about 75 kV and a current of about 1.0 mA and at a conveyor belt speed setting of 50 which provides a conveyor speed of about 1 cm/sec. After curing, the Mylar sheet was removed to provide for a solid cathode laminated to a nickel on nickel current collector.

B. Electrolyte

The electrolyte was prepared by first combining about 137.48 grams of a 1:1 mixture of ethylene carbonate/triglyme and about 34.26 grams of urethane acrylate (available as Photomer 6140 from Henkel Corporation, Coating and Chemicals Division, Ambler, Pa., U.S.A.). The resulting solution was passed through a column of Inhibitor Remover (available as Product No. 31,133-2 from Aldrich Chemical, Milwaukee, Wis., U.S.A.) and then through a column of 4-5A molecular sieves to remove water.

This solution was then combined with about 5.02 grams of polyethylene oxide (number average molecular weight about 600,000 available as Polyox WSR-205 from Union Carbide Chemicals and Plastics, Danbury, Conn., U.S.A.). Once the polyethylene oxide was dispersed, about 23.24 grams of $LiAsF_6$ (available from FMC Corporation Lithium Division, Bessemer City, N.C., U.S.A., as Lectrosalt™) was added while stirring with a laboratory mixer (Yamato Model LR41B, available from Fisher Scientific, Santa Clara, Calif., U.S.A.). Alternatively, the salt can be added before the polyethylene oxide (PEO) and then, after dissolution of the salt, the PEO can be added and stirred until dispersed.

The resulting 200 gram mixture contained the following weight percent of components:

| | |
|---|---|
| ethylene carbonate | 34.37 weight percent |
| triglyme | 34.37 weight percent |
| polyethylene oxide | 2.51 weight percent |
| urethane acrylate | 17.13 weight percent |
| $LiAsF_6$ | 11.62 weight percent |

The mixture was then thoroughly mixed with the same laboratory mixer and heated until a temperature of about 85° C. was reached and then cooled to ambient temperature over at least a 2 hour period while stirring was maintained. This mixture was then placed into a vacuum (at about 0.1 torr) for about 30 minutes.

Afterwards, the electrolyte mixture was then coated by a conventional knife blade to a thickness of about 50 μm onto the surface of the cathode sheet prepared as above (on the side opposite that of the current collector) but without the Mylar covering. The electrolyte was then cured by continuously passing the sheet through an electron beam apparatus (Electrocurtain, Energy Science Inc., Wolburn, Mass., U.S.A.) at a voltage of about 175 kV and a current of about 1.0 mA and at a conveyor speed setting of 50 which provides for a conveyor speed of about 1 cm/sec. After curing, a composite was recovered which contained a solid electrolyte laminated to a solid cathode which, in turn, was laminated to a nickel on nickel current collector.

C. Anode

The anode comprised a sheet of lithium foil (about 76 μm thick) which is commercially available from FMC Corporation Lithium Division, Bessemer City, N.C., U.S.A.

D. The Solid Electrolytic Cell

A sheet comprising a solid electrolytic cell was prepared by laminating the lithium foil anode to the surface of the electrolyte in the sheet produced in step C. above. Lamination was accomplished by minimal pressure.

Four separate solid electrolytic cells were produced in the manner described above and for the purpose of identification were assigned numbers 1664, 1665, 1669, and 1672, respectively. Each electrolytic cell was analyzed for both its discharge capacity (Dis 1664, Dis 1665, Dis 1669 and Dis 1672) as well as its charge capacity (Chrg 1664, Chrg 1665, Chrg 1669 and Chrg 1672).

Discharge capacity measures the total amount of charge the charged electrolytic cell can discharge and is a measure of the useful charge in the electrolytic cell, whereas charged capacity measures the total amount of charge a discharged electrolytic cell can accept. Additionally, the summation of either the discharge capacity or charge capacity over repeated charge/discharge cycles provides for a cumulative capacity for the total number of cycles. When the cumulative capacity is divided by the number of cycles, an average single cycle capacity of the electrolytic cell is achieved. Comparison of the average single cycle capacity against the initial capacity provides a measure of how well the electrolytic cell is able to maintain a consistent capacity over repeated cycles.

The results of this analysis are set forth in FIG. 1 which illustrates that each electrolytic cell not only has a very high initial discharge and charge capacity but that these capacities diminish quite slowly over repeated cycles. As a result, the average single cycle capacity for several cycles for each of these electrolytic cells compares favorably with its initial Capacity.

Example 2

An additional solid electrolytic cell was prepared in the manner similar to that of Example 1 above except that the electrolyte and cathode for this cell employed a 4:1 mixture of propylene carbonate to triglyme as the solvent. In this example, the cathode powder contained 90.44 weight percent of $V_6O_{13}$ and 9.56 weight percent of carbon; the cathode paste contained an approximate weight percent of the following components:

| | |
|---|---|
| $V_6O_{13}$ | 45 weight percent |
| Carbon | 10 weight percent |
| 1:4 triglyme:propylene carbonate | 34 weight percent |
| polyethylene oxide | 1 weight percent |
| polyethylene glycol diacrylate[1] | 8.5 weight percent |
| ethoxylated trimethylpropane triacrylate[1] | 1.5 weight percent |

[1]Inhibitor was removed from both the polyethylene glycol diacrylate and the ethoxylated trimethylpropane triacrylate by contacting each of these compounds with an Inhibitor Remover available as Product No. 31,133-2 from Aldrich Chemical, Milwaukee, Wisconsin, U.S.A. which results in less than 50 ppm of inhibitor in the product.

The electrolyte contained an approximate weight percent of the following components:

| | |
|---|---|
| propylene carbonate | 55.04 weight percent |
| triglyme | 13.76 weight percent |
| polyethylene oxide | 2.50 weight percent |
| urethane acrylate | 17.10 weight percent |
| $LiAsF_6$ | 11.60 weight percent |
| water content | no more than 60 ppm |
| inhibitor content[2] | about 26 ppm |

[2]inhibitor was MEHQ (methyl ether of hydro-quinone)

The approximate dimensions of this electrolytic cell are as follows:

| | |
|---|---|
| Cathode Thickness | 85 μm |
| Anode Thickness[3] | 76 μm |
| Electrolyte Thickness | 50 μm |
| Current Collector Thickness[4] | 25 μm |
| Current Collector Width | 10 μm |

[3]anode contained metallic lithium foil (75 μm) laminated onto a 25 μm thick metallic Ni (as a current collector) by pressure
[4]thickness for the current collector on cathode This electrolytic cell was analyzed for both its discharge capacity as well as its charge capacity. The results of this analysis are set forth in FIG. 2 which illustrates that this electrolytic cell had both a relatively high initial discharge and charge capacity and that the average single cycle capacity from over 50 cycles compares quite favorably with the initial capacity of the electrolytic cell.

COMPARATIVE EXAMPLE A

An additional solid electrolytic cell was prepared in the manner similar to that of Example 1 above with the exception that this electrolytic cell used only propylene carbonate as the solvent in both the cathode and in the electrolyte. In this example, the cathode powder contained 90.44 weight percent of $V_6O_{13}$ and 9.56 weight percent of carbon; the cathode paste contained an approximate weight percent of the following components:

| | |
|---|---|
| $V_6O_{13}$ | 45 weight percent |
| Carbon | 10 weight percent |
| propylene carbonate | 34 weight percent |
| polyethylene oxide | 1 weight percent |
| polyethylene glycol diacrylate | 8.5 weight percent |
| ethoxylated trimethyl-propane triacylate | 1.5 weight percent |

The electrolyte contained an approximate weight percent of the following components:

| | |
|---|---|
| propylene carbonate | 68.85 weight percent |
| polyethylene oxide | 2.51 weight percent |
| urethane acrylate | 17.09 weight percent |
| LiAsF$_6$ | 11.56 weight percent |
| water content | no more than 40 ppm |

The approximate dimensions of this electrolytic cell are as follows:

| | |
|---|---|
| Cathode Thickness | 85 μm |
| Anode Thickness[3] | 76 μm |
| Electrolyte Thickness | 50 μm |
| Current Collector Thickness[4] | 25 μm |
| Current Collector Width | 10 cm |

[3] anode contained metallic lithium foil (75 μm) laminated onto a 25 μm thick metallic Ni (as a current collector) by pressure
[4] thickness for the current collector on cathode This electrolytic cell was analyzed for both its discharge capacity as well as its charge capacity. The results of this analysis are set forth in FIG. 3 which illustrates that this cell had a relatively lower initial discharge and charge capacity as compared to the cell of Example 1. Additionally, the cumulative capacity and the average single cycle capacity of this electrolytic cell is also less than the electrolytic cells of Examples 1 and 2.

COMPARATIVE EXAMPLE B

Two solid electrolytic cells containing only propylene carbonate as the solvent were prepared, and the discharge and charge capacity of these cells were measured over repeated cycles. These cells were prepared in the manner similar to that of Example 1 above except that the diacrylate/triacrylate was exposed to the Inhibitor Remover prior to mixing with the solvent.

In this example, the cathode powder contained 90.44 weight percent of $V_6O_{13}$ and 9.56 weight percent of carbon; the cathode paste contained an approximate weight percent of the following components:

| | |
|---|---|
| $V_6O_{13}$ | 45 weight percent |
| Carbon | 10 weight percent |
| propylene carbonate | 34 weight percent |
| polyethylene oxide | 1 weight percent |
| polyethylene glycol diacrylate | 8.5 weight percent |
| ethoxylated trimethyl-propane triacylate | 1.5 weight percent |

The electrolyte contained an approximate weight percent of the following components:

| | |
|---|---|
| propylene carbonate | 70.56 weight percent |
| polyethylene oxide | 3.35 weight percent |
| polyethylene glycol diacrylate | 9.14 weight percent |
| ethoxylated trimethyl-propane triacylate | 1.93 weight percent |
| LiAsF$_6$ | 15.02 weight percent |

The approximate dimensions of the electrolytic cells are as follows:

| | Electrolytic Cell No. | |
|---|---|---|
| | 1470 | 1471 |
| Cathode Thickness | 80 μm | 75 μm |
| Anode Thickness | 76 μm | 76 μm |
| Electrolyte Thickness | 90 μm | 120 μm |
| Current Collector Thickness | 25 μm | 25 μm |
| Current Collector Width | 10 cm | 10 cm |

These two separate solid electrolytic cells were assigned numbers 1470 and 1471, respectively. Each cell was analyzed for both its discharge capacity (Dis 1470 and Dis 1471 for each cell) as well as its charge capacity (Chrg 1470 and Chrg 1471 for each cell). The results of this analysis are set forth in FIG. 4 which illustrates that while each cell had a very high initial discharge capacity, their discharge capacity diminishes very rapidly over repeated cycles. As a result, the cumulative capacity is significantly reduced as compared to the electrolytic cells of Examples 1 and 2, and the average single cycle capacity of each of these cells is significantly lower than its initial capacity.

COMPARATIVE EXAMPLE C

An additional solid electrolytic cell containing a 1:1 mixture of propylene carbonate and ethylene carbonate as the solvent in the cathode and in the electrolyte was prepared, and the discharge and charge capacity of this cell was measured over repeated cycles. This cell was prepared in the manner similar to that of Example 1 above except that the diacrylate/triacrylate was exposed to the Inhibitor Remover prior to mixing with the solvent.

In this example, the cathode powder contained 90.44 weight percent of $V_6O_{13}$ and 9.56 weight percent of carbon; the cathode paste contained an approximate weight percent of the following components:

| | |
|---|---|
| $V_6O_{13}$ | 45 weight percent |
| Carbon | 10 weight percent |
| propylene carbonate | 17 weight percent |
| ethylene carbonate | 17 weight percent |
| polyethylene oxide | 1 weight percent |
| polyethylene glycol diacrylate | 8.5 weight percent |
| ethoxylated trimethyl-propane triacylate | 1.5 weight percent |

The electrolyte contained an approximate weight percent of the following components:

| | |
|---|---|
| 1:1 propylene carbonate/ ethylene carbonate | 70.57 weight percent |
| polyethylene oxide | 3.35 weight percent |
| polyethylene glycol diacrylate | 9.14 weight percent |
| ethoxylated trimethyl-propane triacylate | 1.93 weight percent |
| $LiAsF_6$ | 15.02 weight percent |

The approximate dimensions of the electrolytic cell are as follows:

| | |
|---|---|
| Cathode Thickness | 80 μm |
| Anode Thickness | 76 μm |
| Electrolyte Thickness | 80 μm |
| Current Collector Thickness | 25 μm |
| Current Collector Width | 10 cm |

This electrolytic cell was analyzed for both its discharge capacity as well as its charge capacity. The results of this analysis are set forth in FIG. 5 which illustrates that while this cell had a very high initial discharge capacity, its discharge capacity diminishes very rapidly over repeated cycles. As a result, the average single cycle capacity of this cell is significantly lower than the initial capacity.

Accordingly, Comparative Example C illustrates that the use of a mixture of propylene carbonate and ethylene carbonate as the solvent in the cathode and in the solid electrolyte does not provide for the same advantages as does the use of a mixture of a carbonate and triglyme as the solvent in the solid electrolyte and cathode.

Example 3

56.51 grams of propylene carbonate, 14.13 grams of triglyme, and 17.56 grams of urethane acrylate (Photomer 6140, available from Henkel Corp., Coating and Chemical Division, Ambler, Pa., U.S.A.) were combined at room temperature until homogeneous. The resulting solution was passed through a column of 4–5A molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn., U.S.A.) was added to the solution and then dispersed while stirring with a magnetic stirrer over a period of about 120 minutes. After dispersion, the solution was heated to between 60° C. and 65° C. with stirring until the film forming agent dissolved. The solution was cooled to a temperature of between 45° and 48° C., a thermocouple was placed at the edge of the vortex created by the magnetic stirrer to monitor solution temperature, and then 9.24 grams of $LiPF_6$ was added to the solution over a 120 minute period while thoroughly mixing to ensure a substantially uniform temperature profile throughout the solution. Cooling was applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif., U.S.A.

The resulting solution contained the following:

| Component | Amount | Weight Percent[a] |
|---|---|---|
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a]= weight percent based on the total weight of the electrolyte solution (100 g)

This solution was then degassed to provide for an electrolyte solution which was clear and had no yellow color evidencing little, if any, $LiPF_6$ salt decomposition.

Optionally, solutions produced as above and which contain the prepolymer, the polyalkylene oxide film forming agent, the electrolyte solvent and the $LiPF_6$ salt are filtered to remove any solid particles or gels remaining in the solution. One suitable filter device is a sintered stainless steel screen having a pore size between 1 and 50 μm at 100% efficiency.

Example 4

The purpose of this example is to illustrate another embodiment for preparing the electrolyte. The mixing procedure is conducted using the following weight percent of components:

| | |
|---|---|
| Propylene Carbonate | 52.472 weight percent |
| Triglyme | 13.099 weight percent |
| Urethane Acrylate[b] | 20.379 weight percent |
| $LiPF_6$ | 10.720 weight percent |
| PEO Film Forming Agent[c] | 3.340 weight percent |

[b](Photomer 6140, available from Henkel Corp., Coating and Chemical Division, Ambler, Pennsylvania, U.S.A.)
[c]polyethylene oxide film forming agent having a number average molecular weight of about 600,000 (available as Polyox WSR-205 from Union Carbide Chemicals and Plastics, Danbury, Connecticut, U.S.A.)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8–12 Mesh from Schoofs Inc., Moraga, Calif., U.S.A.) and then proceed to step 4.

2. Dry the propylene carbonate and triglyme over sodiated 4A molecular sieves (Grade 514, 8–12 Mesh from Schoofs Inc., Moraga, Calif., U.S.A.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif., U.S.A. While stirring at 300 rpm, add the dried and pre-sifted polyethylene oxide film forming agent slowing to the solution. The polyethylene oxide film forming agent should be sifted into the center of the vortex formed by the stirring means over a 30 minute period. Addition of the polyethylene oxide film forming agent should be dispersive, and, during addition, the temperature should be maintained at room temperature (<30° C.).

5. After final addition of the polyethylene oxide film forming agent, stir an additional 30 minutes to ensure that the film forming agent is substantially dispersed.

6. Heat the mixture to 68° C. to 75° C., and stir until the film forming agent has melted and the solution has become transparent to light yellow in color. Optionally, in this step, the mixture is heated to 65° C. to 68° C.

7. Cool the solution produced in step 6, and when the temperature of the solution reaches 40° C., add the $LiPF_6$ salt very slowly making sure that the maximum temperature does not exceed 55° C.

8. After the final addition of the $LiPF_6$ salt, stir for an additional 30 minutes, degas, and let sit overnight and cool.

9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass., U.S.A.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

Example 5

The purpose of this example is to illustrate an alternative method which could be used in the preparation of a solid electrolytic cell containing a solid electrolyte of this invention.

A solid electrolytic cell is prepared by first preparing a cathodic paste which is spread onto a current collector and is then cured to provide for the cathode. An electrolyte solution is then placed onto the cathode surface and is cured to provide for the solid electrolyte composition. Then, the anode is laminated onto the solid electrolyte composition to provide for a solid electrolytic cell. The specifics of this construction are as follows:

A. The Current Collector

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

84.4 weight percent of carbon powder (Shawinigan Black™—available from Chevron Chemical Company, San Ramon, Calif., U.S.A.)

337.6 weight percent of a 25 weight percent solution of polyacrylic acid (a reported average molecular weight of about 90,000, commercially available from Aldrich Chemical Company, Milwaukee, Wis,, U.S.A.—contains about 84.4 grams polyacrylic acid and 253.2 grams water)

578.0 weight percent of isopropanol

The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches [22.86 cm] wide and about 0.0005 inches [0.00127 cm] thick). After application, the solution/foil are contacted with a Mylar wipe (about 0.002 inches [0.005 cm] thick by about 2 inches [5.0 cm] and by about 9 inches [22.86 cm] wide—the entire width of the aluminum foil). The wipe is flexibly engaged with the foil (i.e., the wipe merely contacted the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness or about $3 \times 10^{-4}$ grams per $cm^2$. The aluminum foil is then cut to about 8 inches (20.32 cm) wide by removing approximately 0.5 inch (1.27 cm) from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs. (11.34 kg) of carbon powder (Shawinigan Black™—available from Chevron Chemical Company, San Ramon, Calif., U.S.A.) with 100 lbs. (45.35 kg) of a 25 weight percent solution of polyacrylic acid (average molecular weight of about 240,000, commercially available from BF Goodrich, Cleveland, Ohio, U.S.A., as Good-Rite K702—contains about 25 lbs. [11.34 kg] polyacrylic acid and 75 lbs. [34 kg] water) and with 18.5 lbs. (8.39 kg) of isopropanol. Stirring is done in a 30 gallon polyethylene drum width a gear-motor mixer (e.g., Lightin Labmaster Mixer, model XJ-43, available from Cole-Parmer Instruments Co., Niles, Ill., U.S.A.) at 720 rpm with two 5 inch (12.7 cm) diameter A310-type propellers mounted on a single shaft. This wets down the carbon and eliminates any further dust problem. The resulting weight of the mixture is 143.5 lbs. (65.09 kg) and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla., U.S.A.)

indicates that the particles are 4–6 μm with the occasional 12.5 μm particles. The mixture can be stored for well over 1 month without the carbon settling out or reagglomerating.

When this composition is to be used to coat the current collector, an additional 55.5 lbs. (25.17 kg) of isopropanol is mixed into the composition working with 5 gallon (18,925 l) batches in a plastic pail using an air powered shaft mixer (Dayton model 42231 available from Granger Supply Co., San Jose, Calif., U.S.A.) with a 4 inch (10.16 cm) diameter Jiffy-Mixer brand impeller (such as an impeller available as Catalog No. G-04541-20 from Cole Parmer Instrument Co., Niles, Ill., U.S.A.). Then, it is gear pumped through a 25 μm cloth filter (e.g., So-Clean Filter Systems, American Felt and Filter Company, Newburgh, N.Y., U.S.A.) and Meyer-rod coated as described above.

B. The Cathode

The cathode is prepared from a cathodic paste which, in turn, is prepared from a cathode powder as follows:

i. Cathode Powder

The cathode powder is prepared by combining 90.44 weight percent $V_6O_{13}$ (prepared by heating ammonium metavanadate $[NH_4^+VO_3^-]$ at 450° C. for 16 hours under $N_2$ flow) and 9.56 weight percent of carbon (from Chevron Chemical Company, San Ramon, Calif., U.S.A. under the trade name of Shawinigan Black™). About 100 grams of the resulting mixture is placed into a grinding machine (Attritor Model S-1 purchased from Union Process, Akron, Ohio, U.S.A.) and ground for 30 minutes. Afterwards, the resulting mixture is dried at about 260° C. for 21 hours.

ii. Cathode Paste

A cathode paste is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa., U.S.A.), and about 7.6 grams of ethoxylated trimethylolpropane triacrylate (TMPEOTA) (molecular weight about 450 available as SR-454 from Sartomer Company, Inc., Exton, Pa., U.S.A.) in a double planetary mixer (Ross #2 mixer available from Charles Ross & Sons, Company, Hauppag, N.Y., U.S.A.).

A propeller mixture is inserted into the double planetary mixer, and the resulting mixture is stirred at 150 rpms until homogeneous. The resulting solution is then passed through sodiated 4A molecular sieves. The solution is then returned to double planetary mixer equipped with the propeller mixer, and about 5 grams of polyethylene oxide (number average molecular weight about 600,000 available as Polyox WSR-205 from Union Carbide Chemicals and Plastics, Danbury, Conn., U.S.A.) is added to the solution vortex formed by the propeller by a mini-sieve such as a 25 mesh mini-sieve commercially available as Order No. 57333-965 from VWR Scientific, San Francisco, Calif., U.S.A.

The solution is then heated while stirring until the temperature of the solution reaches 65° C. At this point, stirring is continued until the solution is completely clear. The propeller blade is removed, and the carbon powder prepared as above is then added, as well as an additional 28.71 grams of unground carbon (from Chevron Chemical Company, San Ramon, Calif., U.S.A. under the trade name of Shawinigan Black™). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second and the mixture slowly cooled to 40° C. to 48° C. (e.g. about 45° C.). The resulting cathode paste is maintained at this temperature until just prior to application onto the current collector.

The resulting cathode paste has the following approximate weight percent of components:

| | |
|---|---|
| $V_6O_{13}$ | 45 weight percent |
| Carbon | 10 weight percent |
| 4:1 propylene carbonate/triglyme | 34 weight percent |
| polyethylene oxide | 1 weight percent |
| polyethylene glycol diacrylate | 8.5 weight percent |
| ethoxylated trimethylolpropane triacrylate | 1.5 weight percent |

In an alternative embodiment, the requisite amounts of all of the solid components are added directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C., and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hour.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992, which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste, and the paste is spread to thickness of about 90 microns (μm) with a conventional plate and roller system and is cured by continuously passing the sheet through an electron beam apparatus (Electrocurtain, Energy Science Inc., Woburn, Mass., U.S.A.) at a voltage of about 175 kV and a current of about 1.0 mA and at a rate of about 1 cm/sec. After curing, the Mylar sheet is removed to provide for a solid cathode laminated to the aluminum current collector described above.

C. Electrolyte 56.51 grams of propylene carbonate, 14.13 grams of triglyme, and 17.56 grams of urethane acrylate (Photomer 6140, available from Henkel Corp., Coating and Chemical Division, Ambler, Pa., U.S.A.) are combined at room temperature until homogeneous. The resulting solution is passed through a column of 4A sodiated molecular sieves to remove water and then mixed at room temperature until homogeneous.

At this point, 2.57 grams of polyethylene oxide film forming agent having a number average molecular weight of about 600,000 (available as Polyox WSR-205 from Union Carbide Chemicals and Plastics, Danbury, Conn., U.S.A.) is added to the solution and then dispersed while stirring with a magnetic stirrer over a period of about 120 minutes. After dispersion, the solution is heated to between 60° C. and 65° C. with stirring until the film forming agent dissolved. The solution is cooled to a temperature of between 45° and 48° C., a thermocouple is placed at the edge of the vortex created by the magnetic stirrer to monitor solution temperature, and then 9.24 grams of $LiPF_6$ is added to the solution over a 120 minute period while thoroughly mixing to ensure a substantially uniform temperature profile throughout the solution. Cooling is applied as necessary to maintain the temperature of the solution between 45° and 48° C.

In one embodiment, the polyethylene oxide film forming agent is added to the solution via a mini-sieve such as a 25 mesh mini-sieve commercially available as Order No. 57333-965 from VWR Scientific, San Francisco, Calif., U.S.A.

The resulting solution contains the following:

| Component | Amount | Weight Percent[a] |
| --- | --- | --- |
| Propylene Carbonate | 56.51 g | 56.51 |
| Triglyme | 14.13 g | 14.13 |
| Urethane Acrylate | 17.56 g | 17.56 |
| $LiPF_6$ | 9.24 g | 9.24 |
| PEO Film Forming Agent | 2.57 g | 2.57 |
| Total | 100 g | 100 |

[a] = weight percent based on the total weight of the electrolyte solution (100 g)

This solution is then degassed to provide for an electrolyte solution wherein little, if any, of the $LiPF_6$ salt decomposes.

Optionally, solutions produced as above and which contain the prepolymer, the polyalkylene oxide film forming agent, the electrolytic solvent and the $LiPF_6$ salt are filtered to remove any solid particles or gels remaining in the solution. One suitable filter device is a sintered stainless steel screen having a pore size between 1 and 50 μm at 100% efficiency.

Alternatively, the electrolyte solution can be prepared in the following manner. Specifically, in this example, the mixing procedure is conducted using the following weight percent of components:

| | |
| --- | --- |
| Propylene Carbonate | 52.472 weight percent |
| Triglyme | 13.099 weight percent |
| Urethane Acrylate[a] | 20.379 weight percent |
| $LiPF_6$ | 10.720 weight percent |
| PEO Film Forming Agent[c] | 3.340 weight percent |

[b] (Photomer 6140, available from Henkel Corp., Coating and Chemical Division, Ambler, Pennsylvania, U.S.A.)
[c] polyethylene oxide film forming agent having a number average molecular weight of about 600,000 (available as Polyox WSR-205 from Union Carbide Chemicals and Plastics, Danbury, Connecticut, U.S.A.)

The mixing procedure employs the following steps:

1. Check the moisture level of the urethane acrylate. If the moisture level is less than 100 ppm water, proceed to step 2. If not, then first dissolve the urethane acrylate at room temperature, <30° C., in the propylene carbonate and triglyme and dry the solution over sodiated 4A molecular sieves (Grade 514, 8–12 Mesh from Schoofs Inc., Moraga, Calif., U.S.A.) and then proceed to step 4.

2. Dry the propylene carbonate and triglyme over sodiated 4A molecular sieves (Grade 514, 8–12 Mesh from Schoofs Inc., Moraga, Calif., U.S.A.).

3. At room temperature, <30° C., add the urethane acrylate to the solvent prepared in step 2. Stir at 300 rpm until the resin is completely dissolved. The solution should be clear and colorless.

4. Dry and then sift the polyethylene oxide film forming agent through a 25 mesh mini-sieve commercially available as Order No. 57333-965 from VWR Scientific, San Francisco, Calif., U.S.A. While stirring at 300 rpm, add the dried and pre-sifted polyethylene oxide film forming agent slowly to the solution. The polyethylene oxide film forming agent should be sifted into the center of the vortex formed by the stirring means over a 30 minute period. Addition of the polyethylene oxide film forming agent should be dispersive, and, during addition, the temperature should be maintained at room temperature (<30°C.).

5. After final addition of the polyethylene oxide film forming agent, stir an additional 30 minutes to ensure that the film forming agent is substantially dispersed.

6. Heat the mixture to 68° C. to 75° C. and stir until the film forming agent has melted and the solution has become transparent to light yellow in color. Optionally, in this step, the mixture is heated to 65° C. to 68° C.

7. Cool the solution produced in step 6, and when the temperature of the solution reaches 40° C., add the $LiPF_6$ salt very slowly making sure that the maximum temperature does not exceed 55° C..

8. After the final addition of the $LiPF_6$ salt, stir for an additional 30 minutes, degas, and let sit overnight and cool.

9. Filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is then coated by a conventional knife blade to a thickness of about 50 μm onto the surface of the cathode sheet prepared as above (on the side opposite that of the current collector) but without the Mylar covering. The electrolyte is then cured by continuously passing the sheet through an electron beam apparatus (Electrocurtain, Energy Science Inc., Woburn, Mass., U.S.A.) at a voltage of about 175 kV and a current of about 1.0 mA and at a conveyor speed setting of 50 which provides for a conveyor speed of about 1 cm/sec. After curing, a composite is recovered which contained a solid electrolyte laminated to a solid cathode.

D. Anode

The anode comprises a sheet of lithium foil (about 76 μm thick) which is commercially available from FMC Corporation Lithium Division, Bessemer City, N.C., U.S.A.

E. The Solid Electrolytic Cell

A sheet comprising a solid electrolytic cell is prepared by laminating the lithium foil anode to the surface of the electrolyte in the sheet produced in step C. above. Lamination is accomplished by minimal pressure.

Three electrolytic cells were prepared in the manner described above in this example (using the second reported method for forming the adhesive layer and the first reported method for forming the electrolyte solution), and each of these cells was identical with the exception that a different electrolyte salt was employed therein. Specifically, the first electrolytic cell employed the $LiAsF_6$ salt, the second electrolytic cell employed the $LiPF_6$ salt and the third electrolytic cell employed the $(CF_3SO_3)Li$ salt, and each of these salts was employed at the same molar amounts in the electrolyte.

The electrolytes of these cells were tested for their conductivity, $\sigma/mS\ cm^{-1}$, over a temperature range of from about −10° C. to about 80° C. The test comprises measuring the conductivity of the electrolyte, and higher numbers reflect better results.

The results of this test are shown in FIG. 6 which illustrates that electrolytes employing LiPF$_6$ as the electrolytic salt have substantially identical conductivity over the tested temperature range as compared to electrolytes employing LiAsF$_6$ as the electrolytic salt, and that both of these electrolytes possess significantly better conductivity as compared to electrolyte employing (CF$_3$SO$_3$)Li as the salt.

Additionally, electrolytic cells containing the LiAsF$_6$ and the LiPF$_6$ salts were tested to determine their specific capacity (milliamp-hour per centimeter squared—mAh/cm$^2$) over a large number of cycles. This test determines the rate at which specific capacity declines as a function of the number of cycles and, accordingly, provides a measure of the cumulative capacity of the electro-lytic cell over these cycles. In this regard, electrolytic cells having a higher initial capacity and a slower rate of decline in specific capacity with increased numbers of cycles evidence cells with higher cumulative capacity.

The results of this test are set forth in FIG. 7 which illustrates that electrolytic cells containing the LiPF$_6$ salt have both a higher initial capacity and a lower rate of decline in specific capacity with increased numbers of cycles as compared to electrolytic cells containing the LiAsF$_6$ salt thereby evidencing that the salts of this invention provide for electrolytic cells hating enhanced cumulative capacity.

Additionally, electrolytic cells, in which the solvent contained triglyme and organic carbonate in different proportions were tested to determine their specific capacity over a number of cycles. The composition and manufacture of the cells was otherwise according to the teachings of the present invention. In each case the cathode contained the same solvent as the electrolyte. In each case the cells contained LiAsF$_6$ salt. In each case the carbonate was propylene carbonate, and in each case the test cell was of 24 cm$^2$ area. In five test cells having a weight ratio of carbonate to triglyme of 1.5:1, the initial specific capacity was greater than 2.5 mAh cm$^2$, and the cells maintain the specific capacity >2.5 mAh cm$^{-2}$ for more than 20 cycles. In five test cells having a weight ratio of organic carbonate to triglyme of 9:1, the initial specific was >1.5 mAh cm$^{-2}$, and the cells maintained the specific gravity >1.45 mAh cm$^{-2}$ for more than 60 cycles. However, in five test cells having a weight ratio of organic carbonate to triglyme of 19:1, the initial specific capacity was >1.75 mAh cm$^{-2}$, but most of the cells had lost one-third of their specific capacity after 20 cycles. In summation, satisfactory specific capacity maintained for more than 20 cycles was observed for organic carbonate to triglyme weight ratios $\leq$10:1.

By following the procedures set forth above, other triglymes of Formula I can be used in place of the CH$_3$O(CH$_2$CH$_2$O)$_3$CH$_3$ used in the above examples by mere substitution for this compound. Such other compounds include those of Formula I where R and/or R$_2$ are:

alkyl such as ethyl, n-propyl, isopropyl, n-butyl, n-hexyl, and the like;

phenyl or phenyl substituted with 1 to 3 substituents such as alkyl of from 1 to 4 carbon atoms (2,4-dimethylphenyl, 4-ethylphenyl, 4-n-butylphenyl, 2,4,6-triethylphenyl, etc.); alkoxy of from 1 to 4 carbon atoms (4-ethoxyphenyl, 4-n-butoxyphenyl, etc.); and alkphenyl of from 7 to 12 carbon atoms such as —CH$_2$CH$_2$C$_6$H$_5$, —CH$_2$C$_6$H$_5$CH$_3$, and the like.

Mixtures of these compounds can also be used.

Likewise, other aliphatic or alicyclic carbonates can be used in place of either ethylene carbonate or propylene carbonate used in the above examples. Such other aliphatic or alicyclic carbonates include, by way of example, butylene carbonate, dimethyl carbonate, diethylcarbonate, methyl ethylcarbonate, di-n-propylcarbonate; 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro[1,3-oxa-2-cyclohexanone-5',5'-1',3'-oxa-2'-cyclohexanone] and the like.

While the invention has been described in terms of various preferred embodiments, the skilled artisan will appreciate the various modifications, substitutions, omissions and changes which may be made without departing from the spirit thereof. The descriptions of subject matter in this disclosure are illustrative of the invention and are not intended to be limitations upon the scope of the invention.

What is claimed is:

1. A solid, single-phase, solvent-containing electrolyte which comprises:

a solid polymeric matrix;

LiPF$_6$; and a solvent comprising about a 10:1 to 1:2 weight ratio of an organic carbonate and a triglyme represented by Formula I:

$$RO(R_1O)_3R_2 \qquad \text{I}$$

where R and R$_2$ are independently selected from the group consisting of alkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, chloro and bromo;

R$_1$ is —(CR$_3$R$_4$CR$_5$R$_6$)— where R$_3$, R$_4$, R$_5$ and R$_6$ are independently selected from the group consisting of hydrogen and alkyl of from 1 to 4 carbon atoms; and where the solid electrolyte does not include a separator.

2. The solid, single-phase, solvent-containing electrolyte of claim 1 wherein the R and R$_2$ are —CH$_3$ and R$_1$ is —(CH$_2$CH$_2$)—.

3. The solid, single-phase, solvent-containing electrolyte of claim 2 wherein the organic carbonate is an alicyclic carbonate.

4. The solid, single-phase, solvent-containing electrolyte of claim 3 wherein the alicyclic carbonate is represented by the formula:

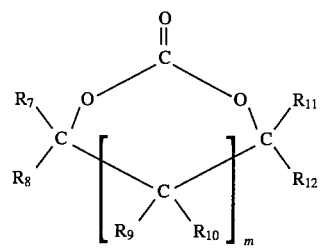

where R$_7$, R$_8$, R$_9$, R$_{10}$, R$_{11}$, and R$_{12}$ are independently selected from the group consisting of hydrogen and alkyl of from 1 to 2 carbon atoms, and m is an integer equal to 0 or 1.

5. The solid, single-phase, solvent-containing electrolyte of claim 4 wherein m is zero, R$_7$, R$_8$, and R$_{11}$ are hydrogen and R$_{12}$ is selected from the group consisting of hydrogen, methyl, and —CH$_2$CH$_3$.

6. The solid, single-phase, solvent-containing electrolyte of claim 5 wherein $R_{12}$ is —$CH_2CH_3$.

7. The solid, single-phase, solvent-containing electrolyte of claim 5 wherein $R_{12}$ is methyl.

8. A solid, single-phase, solvent-containing eletrolyte of claim 1 wherein said $LiPF_6$ comprises from about 5 to about 25 weight percent based on the total electrolyte.

9. The solid, single-phase, solvent-containing electrolyte of claim 1 wherein the weight ratio of organic carbonate to the triglyme of Formula I is from about 9:1 to about 1:1.

10. The solid, single-phase, solvent-containing electrolyte of claim 9 wherein the weight ratio of organic carbonate to the triglyme of Formula I is about 4:1 to about 2:1.

11. The solid, single-phase, solvent-containing electrolyte of claim 9 wherein the weight ratio of organic carbonate to the triglyme of Formula I is about 4:1 to about 1:1.

12. A solid, secondary electrolytic cell which comprises:
an anode containing a compatible anodic material;
a cathode containing a compatible cathodic material; and
interposed therebetween a solid, solvent-containing electrolyte which comprises:
a solid polymeric matrix;
$LiPF_6$; and
a solvent comprising about a 10:1 to 1:2 weight ratio of an organic carbonate and a triglyme represented by Formula I:

$$RO(R_1O)_3R_2 \qquad I$$

where R and $R_2$ are independently selected from the group consisting of alkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, chloro and bromo;
$R_1$ is —$(CR_3R_4CR_5R_6)$— where $R_3$, $R_4$, $R_5$ and $R_6$ are independently selected from the group consisting of hydrogen and alkyl of from 1 to 4 carbon atoms; and where the solid electrolyte does not include a separator.

13. The solid, secondary electrolytic cell of claim 12 wherein the R and $R_2$ are —$CH_3$ and $R_1$ is —$(CH_2CH_2)$—.

14. The solid, secondary electrolytic cell of claim 12 wherein the organic carbonate is an alicyclic carbonate.

15. The solid, secondary electrolytic cell of claim 14 wherein the alicyclic carbonate is represented by the formula:

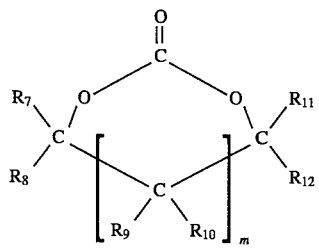

where $R_7$, $R_8$, $R_9$, $R_{10}$, $R_{11}$, and $R_{12}$ are independently selected from the group consisting of hydrogen and alkyl of from 1 to 2 carbon atoms, and m is an integer equal to 0 or 1.

16. The solid secondary electrolytic cell of claim 15 wherein m is zero, $R_7$, $R_8$, and $R_{11}$ are hydrogen and $R_{12}$ is selected from the group consisting of hydrogen, methyl, and —$CH_2CH_3$.

17. The solid, secondary electrolytic cell of claim 16 wherein $R_{12}$ is methyl.

18. The solid, secondary electrolytic cell of claim 16 wherein $R_{12}$ is —$CH_2CH_3$.

19. The solid, secondary electrolytic cell of claim 12 wherein the weight ratio of organic carbonate to the triglyme of Formula I is from about 9:1 to about 1:1.

20. The solid, secondary electrolytic cell of claim 19 wherein the weight ratio of organic carbonate to the triglyme of Formula I is about 4:1 to about 2:1.

21. The solid, secondary electrolytic cell of claim 19 wherein the weight ratio of organic carbonate to the triglyme of Formula I is about 4:1 to about 1:1.

22. The solid, secondary electrolytic cell of claim 12 wherein said electrolyte further comprises a polyoxyalkylene film forming agent comprising repeating units of $$\left[ \begin{array}{c} R \\ | \\ -CH_2CHO- \end{array} \right]_x$$

where R is hydrogen or alkyl of from 1 to 3 carbon atoms and x is an integer such that the number average molecular weight of the film forming agent is at least about 100,000.

23. The solid, secondary electrolytic cell of claim 22 wherein said electrolyte is prepared by a method comprises the steps of:
(a) combining the solvent and a prepolymer employed to prepare the solid polymeric matrix and mixing until homogeneous;
(b) adding the polyalkylene oxide film forming agent to the composition prepared in step (a) above and mixing until a substantially uniform dispersion is formed;
(c) heating the composition at a temperature above 55° C. until the polyalkylene oxide is dissolved;
(d) cooling the composition prepared in step (c) to a temperature above the precipitation point for the polyalkylene oxide film forming agent and less than about 55° C.;
(e) adding the inorganic ion salt to the composition prepared in step (d) while maintaining a temperature in the composition above the precipitation point for the polyalkylene oxide film forming agent and less than about 55° C.; and
(f) applying a sufficient amount of the solution formed in step (e) onto a cathode and curing said solution so as to form a solid, solvent-containing electrolyte having a thickness of from about 25 to about 250 microns.

24. A solid, secondary electrolytic cell of claim 12 wherein said inorganic ion salt is an alkali metal salt.

25. A solid, secondary electrlytic cell of claim 12 wherein said $LiPF_6$ comprises from about 5 to about 25 weight percent based on the total electrolyte.

26. A battery comprising a plurality of the solid, secondary electrolytic cells of claim 12.

27. A solid, secondary electrolytic cell which comprises:
an anode containing a compatible anodic material;
a cathode containing a compatible cathodic material; and
interposed therebetween a solid, single-phase solvent-containing electrolyte which comprises:
a solid polymeric matrix;
$LiPF_6$; and
a solvent comprising about a 10:1 to 1:2 weight ratio of an aliphatic carbonate and a triglyme wherein the aliphatic carbonate is represented by the formulae:

$$R_{13}[OC(O)]_nOR_{14} \text{ and } R_{13}[OC(O)R_{15}]_pOC(O)R_{14}$$

where each $R_{13}$ and $R_{14}$ are independently selected from the group consisting of alkyl of from 1 to 4 carbon atoms; $R_{15}$ is an alkylene group of from 2 to 4 carbon atoms; n is an integer of from 1 to 2, and p is an integer from 1 to 4 and the triglyme is represented by the Formula I $$RO(R_1O)_3R_2 \qquad\qquad I$$

where R and $R_2$ are independently selected from the group consisting of alkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, chloro and bromo;

$R_1$ is —$(CR_3R_4CR_5R_6)$— where $R_3$, $R_4$, $R_5$ and $R_6$ are independently selected from the group consisting of hydrogen and alkyl of from 1 to 4 carbon atoms; and where the solid electrolyte does not include a separator.

28. The solid single-phase, solvent-containing electrolyte of claim 27 wherein said $LiPF_6$ comprises from about 5 to about 25 weight percent based on the total electrolyte.

29. A solid, single-phase, solvent-containing electrolyte which comprises:

a solid polymeric matrix;

$LiPF_6$; and a solvent comprising about a 10:1 to 1:2 weight ratio of an aliphatic carbonate and a triglyme wherein the aliphatic carbonate is represented by the formulae:

$$R_{13}[OC(O)]_nOR_{14} \text{ and } R_{13}[OC(O)R_{15}]_pOC(O)R_{14}$$

where each $R_{13}$ and $R_{14}$ are independently selected from the group consisting of alkyl of from 1 to 4 carbon atoms; $R_{15}$ is an alkylene group of from 2 to 4 carbon atoms; n is an integer of from 1 to 2, and p is an integer from 1 to 4 and the triglyme is represented by the Formula I $$RO(R_1O)_3R_2 \qquad\qquad I$$

where R and $R_2$ are independently selected from the group consisting of alkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, chloro and bromo;

$R_1$ is —$(CR_3R_4CR_5R_6)$— where $R_3$, $R_4$, $R_5$ and $R_6$ are independently selected from the group consisting of hydrogen and alkyl of from 1 to 4 carbon atoms; and where the solid electrolyte does not include a separator.

30. A solid, single-phase, solvent-containing electrolyte of claim 29 wherein said $LiPF_6$ comprises from about 5 to about 25 weight percent based on the total electrolyte.

31. A method for enhancing the cumulative capacity of a solid, secondary electrolytic cell comprising an anode containing a compatible anodic material, a cathode containing a compatible cathodic material; and interposed therebetween a solid, solvent-containing electrolyte which method comprises:

(a) selecting a solid, single-phase solvent-containing electrolyte which comprises:

a solid polymeric matrix;

$LiPF_6$; and a solvent comprising about a 10:1 to 1:2 weight ratio of an organic carbonate and a triglyme represented by Formula I:

$$RO(R_1O)_3R_2 \qquad\qquad I$$

where R and $R_2$ are independently selected from the group consisting of alkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, chloro and bromo;

$R_1$ is —$(CR_3R_4CR_5R_6)$— where $R_3$, $R_4$, $R_5$ and $R_6$ are independently selected from the group consisting of hydrogen and alkyl of from 1 to 4 carbon atoms where the solid electrolyte does not include a separator; and (b) incorporating the solid, single-phase solvent-containing electrolyte into the electrolytic cell.

32. The method of claim 31 wherein $LiPF_6$ comprises from about 5 to about 25 weight percent based on the total electrolyte.

33. The method of claim 31 wherein the R and $R_2$ are —$CH_3$ and $R_1$ is —$(CH_2CH_2)$—.

34. The method of claim 33 wherein the organic carbonate is an alicyclic carbonate is represented by the formula:

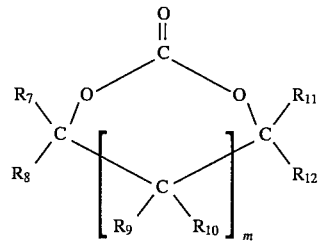

wherein $R_7$, $R_8$, $R_9$, $R_{10}$, $R_{11}$, and $R_{12}$ are independently selected from the group consisting of hydrogen and alkyl of from 1 to 2 carbon atoms; and m is an integer equal to 0 or 1.

35. The method of claim 34 wherein m is zero, $R_7$, $R_8$, $R_{11}$, and $R_{12}$ are hydrogen.

36. The method of claim 33 wherein the organic carbonate is an aliphatic carbonate that is represented by the formulae:

$$R_{13}[OC(O)]_nOR_{14} \text{ and } R_{13}[OC(O)R_{15}]_pOC(O)R_{14}$$

where each $R_{13}$ and $R_{14}$ are independently selected from the group consisting of alkyl of from 1 to 4 carbon atoms; $R_{15}$ is an alkylene group of from 2 to 4 carbon atoms; n is an integer of from 1 to 2, and p is an integer from 1 to 4.

* * * * *